United States Patent
Chen et al.

(12) 
(10) Patent No.: US 12,506,627 B2
(45) Date of Patent: Dec. 23, 2025

(54) COMPUTATION OFFLOADING APPROACH IN BLOCKCHAIN-ENABLED MCS SYSTEMS

(71) Applicant: FUZHOU UNIVERSITY, Fuzhou (CN)

(72) Inventors: Zheyi Chen, Fuzhou (CN); Junjie Zhang, Fuzhou (CN); Sijin Huang, Fuzhou (CN); Zhiqin Huang, Fuzhou (CN); Wang Zeng, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 206 days.

(21) Appl. No.: 18/399,719

(22) Filed: Dec. 29, 2023

(65) Prior Publication Data

US 2025/0168021 A1   May 22, 2025

Related U.S. Application Data

(63) Continuation of application No. PCT/CN2023/132501, filed on Nov. 20, 2023.

(51) Int. Cl.
*H04L 9/00*        (2022.01)
*H04L 9/06*        (2006.01)

(52) U.S. Cl.
CPC ............. *H04L 9/50* (2022.05); *H04L 9/0643* (2013.01); *H04L 2209/56* (2013.01)

(58) Field of Classification Search
None
See application file for complete search history.

(56) References Cited

U.S. PATENT DOCUMENTS

2023/0153124 A1*   5/2023   Zhao ............... G06F 9/4806
                                              718/100

OTHER PUBLICATIONS

Huang, Junqin et al. "Towards Secure Industrial IoT: Blockchain System With Credit-Based Consensus Mechanism" [online] IEEE, Jun. 6, 2019 [retrieved Sep. 4, 2025]. Retrieved from the Internet: URL: https://ieeexplore.ieee.org/document/8661654 (Year: 2019).*

(Continued)

*Primary Examiner* — Taghi T Arani
*Assistant Examiner* — Joshua Raymond White
(74) *Attorney, Agent, or Firm* — Bayramoglu Law Offices

(57) ABSTRACT

A computation offloading approach in blockchain-enabled MCS systems is provided to reach a lower total cost in computation offloading. Firstly, building a consortium blockchain-based framework to guarantee secure transactions in MCS systems. Secondly, designing a novel credit-based proof-of-work (C-PoW) algorithm instead of PoW to confirm transactions and add new blocks to the chain, thereby relieving the complexity of POW while keeping the reliability of blockchain. Thirdly, using a scalable deep reinforcement learning based computation offloading (DRCO) method to handle the computation-intensive tasks of C-PoW; by integrating PPO and DNC, the DRCO executes differentiable read-write operations on structured external memories by following an objective-oriented way; the DRCO uses a clipped surrogate objective to control the update of offloading policy, in order to improve the decision-making efficiency; the DRCO uses the DNNs to address the problem of high-dimensional state space.

4 Claims, 4 Drawing Sheets

(56) References Cited

OTHER PUBLICATIONS

Uddin, Moin et al. "CBCIoT: A Consensus Algorithm for Blockchain-Based IoT Applications" [online] MDPI, Nov. 20, 2021 [retrieved Sep. 4, 2025]. Retrieved from the Internet: URL: https://www.mdpi.com/2076-3417/11/22/11011 (Year: 2021).*

Sadiki, Abdeladim et al. "Deep reinforcement learning for the computation offloading in MIMO-based Edge Computing" [online] Science Direct, Mar. 15, 2023 [retrieved Sep. 4, 2024]. Retrieved from the Internet: URL: https://www.sciencedirect.com/science/article/pii/S1570870522002529 (Year: 2023).*

Graves, Alex et al. "Hybrid computing using a neural network with dynamic external memory" [online] Nature, Oct. 12, 2016 [retrieved Sep. 4, 2023]. Retrieved from the Internet: URL: https://www.nature.com/articles/nature20101 (Year: 2016).*

Schulman, John et al. "Proximal Policy Optimization Algorithms" [online] arxiv, Aug. 28, 2017 [retrieved Sep. 4, 2025]. Retrieved from the Internet: URL: https://arxiv.org/abs/1707.06347 (Year: 2017).*

John Schulman, et al., Proximal Policy Optimization Algorithms, arXiv preprint arXiv:1707.06347v2, 2017, pp. 1-12.

Lichuan Ma, et al., Privacy-Preserving Reputation Management for Edge Computing Enhanced Mobile Crowdsensing, IEEE Transactions on Services Computing, 2019, pp. 786-799, vol. 12, No. 5.

Dapeng Wu, et al., Dynamic Trust Relationships Aware Data Privacy Protection in Mobile Crowd-Sensing, IEEE Internet of Things Journal, 2018, pp. 2958-2970, vol. 5, No. 4.

Jianbing Ni, et al., Enabling Strong Privacy Preservation and Accurate Task Allocation for Mobile Crowdsensing, IEEE Transactions on Mobile Computing, 2020, pp. 1317-1331, vol. 19, No. 6.

Haiqin Wu, et al., Enabling Data Trustworthiness and User Privacy in Mobile Crowdsensing, IEEE/ACM Transactions on Networking, 2019, pp. 2294-2307, vol. 27, No. 6.

Thinh Quang Dinh, et al., Learning for Computation Offloading in Mobile Edge Computing, IEEE Transactions on Communications, 2018, pp. 6353-6367, vol. 66, No. 12.

Minghui Min, et al., Learning-Based Computation Offloading for IoT Devices With Energy Harvesting, IEEE Transactions on Vehicular Technology, 2019, pp. 1930-1941, vol. 68, No. 2.

Shameek Bhattacharjee, et al., QnQ: Quality and Quantity Based Unified Approach for Secure and Trustworthy Mobile Crowdsensing, IEEE Transactions on Mobile Computing, 2020, pp. 200-216, vol. 19, No. 1.

Yifan Chen, et al., A Stackelberg game approach to multiple resources allocation and pricing in mobile edge computing, Future Generation Computer Systems, 2020, pp. 273-287, vol. 108.

Ji Li, et al., Deep Reinforcement Learning based Computation Offloading and Resource Allocation for MEC, IEEE Wireless Communications and Networking Conference (WCNC), 2018.

Jian Lin, et al., Frameworks for Privacy-Preserving Mobile Crowdsensing Incentive Mechanisms, IEEE Transactions on Mobile Computing, 2018, pp. 1851-1864, vol. 17, No. 8.

Sowndarya Sundar, et al., Offloading Dependent Tasks with Communication Delay and Deadline Constraint, IEEE Conference on Computer Communications, 2018, pp. 37-45.

Guowen Xu, et al., Efficient and Privacy-Preserving Truth Discovery in Mobile Crowd Sensing Systems, IEEE Transactions on Vehicular Technology, 2019, pp. 3854-3865, vol. 68, No. 4.

Changsheng You, et al., Energy-Efficient Resource Allocation for Mobile-Edge Computation Offloading, IEEE Transactions on Wireless Communications, 2017, pp. 1397-1411, vol. 16, No. 3.

Chuan Zhang, et al., Reliable and Privacy-Preserving Truth Discovery for Mobile Crowdsensing Systems, IEEE Transactions on Dependable and Secure Computing, 2021, pp. 1245-1260, vol. 18, No. 3.

* cited by examiner

ABSTRACT# COMPUTATION OFFLOADING APPROACH IN BLOCKCHAIN-ENABLED MCS SYSTEMS

CROSS REFERENCE TO THE RELATED APPLICATIONS

This application is the continuation application of International Application No. PCT/CN2023/132501, filed on Nov. 20, 2023, the entire contents of which are incorporated herein by reference.

TECHNICAL FIELD

The present invention belongs to the technical field of mobile crowdsensing, in particular relates to a computation offloading approach in blockchain-enabled MCS systems.

BACKGROUND

Mobile devices (MDs) with built-in sensors empower Mobile Crowdsensing (MCS) to become a low-cost and flexible way of collecting sensing data. MCS has become a key building block of many emerging Internet-of-Things (IoT) applications. In typical MCS systems, sensing tasks are first published by IoT applications to cloud service providers (CSPs), where payment strategies are designed and released. Next, the sensing tasks are executed by the MDs of MCS participants, and then they upload the sensing data to CSPs. Once completing the evaluation of data quality, participants can get payment from CSPs. Finally, the uploaded sensing data can be used to provide heterogeneous smart services, such as traffic monitoring, service recommendation, and weather prediction.

In order to secure the payment transactions between CSPs and MCS participants, it is vital to establish a reliable trading mechanism for MCS systems. However, most of the traditional platforms confirm and store transactions via a centralized way, posing intense security issues and performance bottlenecks. Meanwhile, it may happen the single point failure and thus cannot promise reliable services in MCS. As a distributed and append-only ledger, Blockchain offers an effective mechanism for reliable transactions on the Bitcoin network, which has found many applications such as virtual currency and smart contracts that can be well operated without being intervened by a third party. On the Bitcoin network, users should run a Proof-of-Work (PoW) algorithm to reach the global consensus before a transaction can be verified (e.g. by digital signatures) and appended to the blockchain, where only the longest chain is recognized and maintained. If malicious users intend to tamper with the data on the existing chain, they must generate a new chain that exceeds the length of the existing one, which means that they need to control more than half of the computational capacity on the entire blockchain network. When such attacks happen in the large-scale network with many blockchain users, the input cost of malicious users would be much higher than their expected benefits. Therefore, Blockchain can effectively deny and drop the conflicting transactions from malicious users. Considering the distributed, reliable, and tamper-resistant characteristics of Blockchain, it can be used to guarantee secure and effective payment transactions in MCS systems. Moreover, after successfully appending a new block, a user will obtain a certain reward in return. However, the application of Blockchain in MCS is still obstructed by the computation-intensive PoW, due to the limited computational capacity of MDs.

SUMMARY

The purpose of the present invention is to provide a computation offloading approach in blockchain-enabled MCS systems, so as to reach a lower total cost in computation offloading.

To realize the above purpose, the technical solution of the present invention is as follows: a computation offloading approach in blockchain-enabled MCS systems, wherein it comprises:

building a consortium blockchain-based framework to guarantee secure transactions in MCS systems;

designing a novel credit-based proof-of-work (C-PoW) algorithm instead of PoW to confirm transactions and add new blocks to the chain, thereby relieving the complexity of PoW while keeping the reliability of blockchain;

using a scalable deep reinforcement learning based computation offloading (DRCO) method to handle the computation-intensive tasks of C-PoW; by integrating PPO and DNC, the DRCO executes differentiable read-write operations on structured external memories by following an objective-oriented way; the DRCO uses a clipped surrogate objective to control the update of offloading policy, in order to improve the decision-making efficiency; the DRCO uses the DNNs to address the problem of high-dimensional state space.

Further, in the consortium blockchain-based framework, a transaction is first added by an MD to a new block; after the new block is done, it is broadcasted to other MDs on the blockchain network; next, this new block is received and verified by each of the other MDs with the concerns of security and data integrity; once passing the verification, it will be finally added to the blockchain maintained by the MDs; otherwise, it will be dropped; when an MD successfully appends a new block, it will obtain a certain reward; this process is called the mining in Blockchain, ensuring the decentralized security;

there is only one blockchain that is maintained, but MDs may generate different new blocks simultaneously; MDs must choose the same new block to be appended; the MD must complete some extra work before it broadcasts the new block, including the following steps:

Step 1: The contents of $Block_n$ are transferred to a string, denoted by $Str_n = SHA256(Block_{n-1}) +$ the basic information of $Block_n +$ the transactions in $Block_n$; each block owns a one-to-one correspondence with SHA256( ) value, a cryptographic hash function, to make index; $Block_n$ contains the SHA256( ) value of the contents in $Block_{n-1}$; therefore, the SHA256( ) value is used to connect blocks in order;

Step 2: A random value nonce is appended to $Str_n$ to form a new string, denoted by $Str'_n = Str_n +$ nonce; next, $Str'_n$ is added to SHA256( ) to get a 256-bit binary value; as described in Eq. (1), if the binary value is smaller than the target, which indicates the mining difficulty, the extra work is completed successfully; the difficulty of mining, denoted by D, increases as the number of MDs grows, and thus avoid the conflicts if MDs tend to append blocks simultaneously;

$$\text{Find nonce s.t. } SHA256(Str'_n) < \text{target}, \quad (1)$$

where target=$2^{(256-D)}-1$, and D=$D_{base}$+lg(m); $D_{base}$ represents the predefined basic difficulty of mining (0≤D base≤255), and m is the number of MDs; for an edge environment with a single server, the expected computational resources for processing mining tasks are much lower than that in the traditional Bitcoin mining.

Further, in the proposed C-PoW, using the user credit (VC) to evaluate the contributions of participants to MCS sensing task; VC is positively correlated to the amount of valid uploaded data; the VC of an MCS participant for a sensing task is defined as $$VC_n = 1 + \frac{v_n}{v_{total}}, \quad (2)$$

where $V_n$ and $V_{total}$ are the amount of valid data uploaded from $MD_n$ and the total amount of data required for a sensing task, respectively; $VC_n$ only works for one sensing task and cannot be accumulated for other different sensing tasks; when the sensing task is completed or changed, the corresponding $V_n$ is recalculated;

through introducing VC into the mining process, the POW in Eq. (1) is modified as follows:

$$\text{Find nonce s.t. } SHA256(Str'_n) < VC_n \cdot \text{target}, \quad (3)$$

following the proposed C-PoW, if a participant contributes more to an MCS sensing task, it will obtain higher VC and the mining difficulty will be relieved slightly; otherwise, the participant cannot enjoy special treatment as it processes the PoW task; meanwhile, higher credit leads to higher priority of broadcasting and verifying especially when many participants tend to append blocks.

Further, due to the limited computational capacity of MDs, offloading C-PoW tasks to edge servers for execution;
building a offloading model to reduce the cost of processing C-PoW tasks in blockchain-based MCS systems; considering a single-edge scenario, which consists of one edge server with one base stations (BSs), and a set of MDs, donated by MD={$MD_1$, $MD_2$, ... , $MD_m$}, where m represents the number of MDs; the bandwidth is equally shared by MDs;
when an MD finish an MCS transaction, the transaction will be stored to a block and it is tended to be appended to the blockchain; for this purpose, the MD should process a C-PoW task, and the block will be broadcast and verified by other MDs;
a C-PoW task to be processed by $MD_n$ (1≤n≤m) is defined as a 2-tuple, denoted by $T_n$=<$D_n$, $U_n$>; $D_n$ indicates the size of input data (contents of a block), and it is also input to SHA256( ); $U_n$ indicates the computational resources needed (i.e. CPU cycles) to process $T_n$, positive to the hashes for achieving the qualified value of SHA256( ), where the calculating speed is one hash per CPU cycle; moreover, the computational capacity of an edge server and an MD are denoted by E and $e_n^{local}$, respectively;
The edge server and MDs offers computing services for C-PoW tasks that can be processed locally or offloaded for execution; therefore, two modes are defined as follows;

Local Mode: When $T_n$ is processed locally, the latency generated by $MD_n$ is defined as:

$$L_n^{local} = \frac{U_n}{e_n^{local}}. \quad (4)$$

the power consumption of processing $T_n$ is defined as:

$$P_n^{local} = \psi \cdot (e_n^{local})^2 \cdot U_n, \quad (5)$$

where $\psi$ is the power parameter for each CPU cycle;
As there is large difference between the value range of $L_n^{local}$ and $P_n^{local}$, it would be hard to weight them for balancing latency and power consumption; to address this problem, $L_n^{local}$ and $P_n^{local}$ are normalized into the same-scale values, donated by [a, b], where a=avg(min ($L_n^{local}$), min($P_n^{local}$)) and b=avg(max($L_n^{local}$), max ($P_n^{local}$)); this simplifies the process of weighting the latency and power consumption in the proposed model and accelerate the convergence of our algorithms; the normalization equation is given by $$x' = a + \mathcal{N} \cdot (x - \min(X)), \quad (6)$$

where x is the input data (e.g. $L_n^{local}$ or $P_n^{local}$) and x' is the output value after normalization (e.g. ($L_n^{local}$)' or ($P_n^{local}$)');

$$\mathcal{N} = \frac{b-a}{\max(x) - \min(x)}$$

is the normalization coefficient. max(X) and min(X) are the maximum and minimum values of the sample data X (e.g. $\mathcal{X}$=($L_1^{local}$, $L_2^{local}$, ... , $L_n^{local}$));
after normalization, defining the cost of completing the task $T_n$ in Local Mode as $$C_n^{local} = \theta \cdot (L_n^{local})' + (1-\theta) \cdot (P_n^{local})', \quad (7)$$

where θ (0≤θ≤1) is used to weight different items;
Edge Mode: When $T_n$ is offloaded for processing, the procedure is given as follows;
Step 1: $MD_n$ uploads the input data $D_n$ to an edge server via a wireless channel; defining the corresponding transmission latency that happens in $MD_n$ as $$L_n^{edge,t} = \frac{D_n}{r_n}, \quad (8)$$

where $r_n$ is the uplink rate of $MD_n$;
The corresponding power consumption of $MD_n$ is defined as $$P_n^{edge,t} = P_n^{trans} \cdot L_n^{edge,t}, \quad (9)$$

where $P_n^{trans}$ is the transmission power of $MD_n$;

Step 2: The edge server allocates computational resources and processes $T_n$; defining the latency of processing $T_n$ as $$L_n^{edge,p} = \frac{U_n}{e_n^{edge}}, \quad (10)$$

where $e_n^{edge}$ represents the allocated computational resources to process $T_n$, and $\Sigma_1^m e_n^{edge} \leq E$;

The corresponding power consumption is defined as $$P_n^{edge,p} = (P^{server} + P_n^{idle}) \cdot L_n^{edge,p}, \quad (11)$$

where $P^{server}$ and $P_n^{idle}$ are the power of the edge server and the idle power of $MD_n$, respectively;

Step 3: $MD_n$ downloads the result of task $T_n$; the result is nonce that meet target of C-PoW; because the data size of nonce is small, the downloading costs are neglectable; with Eq. (6), the cost of completing the task $T_n$ in Edge Mode is:

$$C_n^{edge} = \theta \cdot (L_n^{edge})' + (1-\theta) \cdot (P_n^{edge})'. \quad (12)$$

where $\theta$ is defined in Eq. (7); moreover, the latency and power consumption of completing the task $T_n$ in Edge Mode is calculated by Eq. (13);

$$L_n^{edge} = L_n^{edge,t} + L_n^{edge,p}, \quad P_n^{edge} = P_n^{edge,t} + P_n^{edge,p}. \quad (13)$$

By combining the cost of these two modes, the total cost with different offloading decisions is calculated as:

$$C^{total} = \sum_1^m ((1-a_n) \cdot C_n^{local} + a_n \cdot C_n^{edge}), \quad (14)$$

where $a_n \in \{0, 1\}$ indicates the offloading decision of $MD_n$; moreover, $C_n^{local}$ and $C_n^{edge}$ are the cost of completing the task $T_n$ in Local Mode and Edge Mode, respectively.

Further, using the DRCO to obtain the optimal offloading in block-chain-based MCS systems; a offloading scenario in blockchain-based MCS systems is regarded as the environment, and the Deep Reinforcement Learning (DRL) agent selects actions by communicating with the environment; the state space, action space and reward function for DRCO are defined as follows;

State space: The state contains four parts, including the set of C-PoW task (denoted by T), set of the computational capacity of MDs (denoted by $\varepsilon^{local}$), available computational capacity of the edge server (denoted by $E^{avail}$), and network status (denoted by O), where $T=\{T_1, T_2, \ldots, T_m\}$, $\varepsilon^{local}=\{e_1^{local}, e_2^{local}, \ldots, e_m^{local}\}$, $E^{avail}=E-\Sigma_1^m e_n^{edge}$, and O contains the bandwidth and uplink rate of each MD. It is defined as a 4-tuple, denoted by $S=<T, \varepsilon^{local}, E^{avail}, O>$, considering the task overhead, system resource, and network status;

Action space: The DRL agent takes offloading actions for C-PoW tasks; it is defined as $A=\{a_n | a_n \in \{0, 1\}, 1 \leq n \leq m\}$, which indicates the binary offloading decision for each MD; if $a_n=1$, the task $T_n$ is processed by $MD_n$ locally; otherwise, $T_n$ is offloaded for execution;

Reward function: The reward function guides the DRL agent to learn the optimized policy, aiming to minimize the total cost of computation offloading; it is negatively-correlated to the total cost (denoted by $C^{total}$) after making offloading decisions, which is defined as $$\mathcal{R} = 1 - \frac{C^{total}}{\sum_1^m C_n^{local} + \sum_1^m C_n^{edge}}, \quad (15)$$

where $$\sum_1^m C_n^{local} \text{ and } \sum_1^m C_n^{edge}$$

indicate the cost when all C-PoW tasks are processed by MDs or the edge server, respectively, which are used to normalize $C^{total}$;

the DRL agent first selects an offloading action based on the current state; accordingly, a reward is feedback from the environment and state goes to the next; it is formulated as a Markov decision process (MDP); a model-free RL is used in the DRCO method; Proximal Policy Optimization (PPO) is used to train DNNs for optimizing offloading policies; PPO is an actor-critic based RL, combining the value-based RL (i.e. critic) and policy-based RL (i.e. actor); the DRCO method includes the following steps: first, initializing the actor's network $V^{\pi_\theta}$ and critic's network $Q^{\pi_\theta}$; the actor's and critic's learning rate $\gamma_a$ and $\gamma_c$, reward decay rate $\lambda$, TD error discount factor $\beta$, mini-batch size $\alpha$, and memory module M in the DNC cell are initialized; after initializing the state, starting the training epochs for the DRCO;

in each training epoch, the environment is first refreshed; next, the offloading actions for C-PoW tasks are selected on the current state; next, the reward is calculated after executing the offloading actions, and the environment steps to the next state; during the training process, sample trajectories are stored in the memory M; next, policy parameters are updated by mini-batch; the training of DRCO is based on the policy gradient algorithm with the gradient estimator as:

$$\nabla_{\theta_t} J(\theta_t) = E_{\pi_{\theta_t}} [\nabla_{\theta_t} \log \pi_{\theta_t}(S_t, A_t) Q^{\pi_{\theta_t}}(S_t, A_t)], \quad (16)$$

where $$E_{\pi_{\theta_t}}$$

is the empirical average, $\pi_{\theta_t}$ is the offloading policy, and $$Q^{\pi_{\theta_t}}$$

is the action-value function;

In each mini-batch, the discounted rewards of recent actions are first calculated; next, reducing the gradient variance by using an advantage function, denoted by $$AF^{\pi_{\theta_t}},$$

where $V^{\pi_\theta}$ is the state-value function; next, optimizing $$AF^{\pi_{\theta_t}}$$

by minimizing the loss of the critic's network, which is denote by $$L^{critic}(\theta_t) = E_{\mathcal{M}}(\delta^{\pi_{\theta_t}})^2,$$

where $$\delta^{\pi_{\theta_t}} = \mathcal{R}_t + \beta V^{\pi_{\theta_{t+1}}}(\mathcal{S}_{t+1}) - V^{\pi_{\theta_t}}(\mathcal{S}_t);$$

furthermore, the gradient estimator is obtained by differentiating the objective function of policy gradient as:

$$J(\theta_t) = E_{\pi_{\theta_t}}[\log \pi_{\theta_t}(\mathcal{S}_t, \mathcal{A}_t) AF^{\pi_{\theta_t}}(\mathcal{S}_t, \mathcal{A}_t)]. \quad (17)$$

integrating PPO and DNC to enhance the scalability and efficiency of learning the optimal policy; the DNC cell adopts a network controller to control the reading and writing in memory, enabling the DRL agent to be optimized via an objective-oriented way; the network controller constructed by DNN first receives the system state from the environment. Meanwhile, the memory module stores the state and reward from the environment, and the action from the actor's network, respectively; next, the interface vector $\xi$ is generated to parameterize the interactions between the network controller and memory module, which ensures that the memory module is updated in the correct domain for approaching the optimal offloading policies; finally, through concatenating the output vector v of the network controller and the read vector Read of the memory module, the final output of the DNC cell is calculated in a linear layer as follows:

$$V^{\pi_{\theta_t}}(s) = v + W_R \cdot \text{Read}. \quad (18)$$

where $W_R$ is the weight matrix of the linear layer;
in the DNC cell, a differentiable attention mechanism determines the locations that contain read or write operations in the memory module, where weightings are trained to make decisions for executing these operations; a read vector is defined as follows:

$$\text{Read} = \omega^r \cdot \mathcal{M}^\top. \quad (19)$$

where the read weight $w^r$ is used to calculate the weighted averages over the contents of locations, and M indicates the current status of the memory matrix;
the write operation is a combination of the write weight $w^w$, an erase vector e, and a write vector Write; thus, the memory matrix M is updated by the following write operation:

$$\mathcal{M} = \mathcal{M}' \cdot (1 - \omega^\omega \cdot e^\top) + \omega^\omega \cdot \text{Write}^\top. \quad (20)$$

where the vectors e and Write are the components of interface vector, $\xi$ and M' represents the status of the memory matrix at the last timestep;
with the effective memory operations provides by the DNC cell, an efficient $$V^{\pi_{\theta_t}}(s)$$

estimation is obtained for the critic's network in the PPO-based DRL agent;
the gradient estimator is then modified as:

$$\nabla_{\theta_t} J(\theta_t) = E_{\pi_{\theta_t}}[\nabla_{\theta_t} \log \pi_{\theta_t}(s, a) AF^{\pi_{\theta_t}}(\mathcal{S}_t, \mathcal{A}_s)]. \quad (21)$$

the gradient estimator is calculated by differentiating the following objective function of policy gradient:

$$L^{PG}(\theta_t) = J(\theta_t) = E_{\pi_{\theta_t}}[\log \pi_{\theta_t}(\mathcal{S}_t, \mathcal{A}_s) AF^{\pi_{\theta_t}}(\mathcal{S}_t, \mathcal{A}_s)]. \quad (22)$$

utilizing Kullback-Leibler (KL) to restrict the differences between the old and new policy to a certain value $\xi$ (i.e., the trust region) in Eq. (23);

$$\underset{\theta_t}{\text{maximum}} E_{\pi_{\theta_t}} \left[ \frac{\pi_\theta(\mathcal{S}_t, \mathcal{A}_s)}{\pi_{\theta_{old}}(\mathcal{S}_t, \mathcal{A}_s)} AF^{\pi_{\theta_t}}(\mathcal{S}_t, \mathcal{A}_s) \right], \quad (23)$$

$$\text{s.t. } E_{\pi_{\theta_t}}[KL[\pi_{\theta_{old}}(\mathcal{S}_t), \pi_{\theta_t}(\mathcal{S}_t)]] \leq \xi$$

where $\theta_{old}$ represents the old policy;
following the above formula, the old policy is first used for data sampling (i.e., state, action, and rewards) in the environment; next, random sampling is performed on these data to obtain the mini-batch for optimizing the policy; a second derivative is executed for estimating the constraint; optimizing the efficiency of data sampling through using the first derivative with a clipped surrogate objective as:

$$L^{CLIP}(\theta_t) = \quad (24)$$

$$E_{\pi_{\theta_t}}[\min(r(\theta) AF^{\pi_{\theta_t}}(\mathcal{S}_t, A_r), \text{clip}(r(\theta_t), 1-\epsilon, 1+\epsilon) AF^{\pi_{\theta_t}}(\mathcal{S}_t, A_r))],$$

$$\text{where } r(\theta_t) = \pi_\theta(\mathcal{S}_t, A_r)/\pi_{\theta_{old}}(\mathcal{S}_t, A_r).$$

through using the clip function, the cases that $r(\theta_t)$ leave the interval $[1-\epsilon, 1+\epsilon]$ would be eliminated, which also means that the changes of $r(\theta)$ would be omitted (i.e., clipped to the interval [1−ε, 1+ε]) when $r(\theta_t)$ makes the objective function optimized to a certain extent;

referring to the critic's evaluation, the actor optimizes the clipped surrogate objective $L^{CLIP}(\theta_t)$ with low variance by using the advantage function $$AF^{\pi_{\theta_t}}(\mathcal{S}_t, \mathcal{A}_t);$$

with the help of the clipped surrogate objective $L^{CLIP}(\theta_t)$, the efficiency of data sampling and the decision making of step size is greatly improved; finally, the environment updates its current state to the next one and goes to the subsequent episode.

Compared with the prior art, the present invention has the following beneficial effects: the present invention builds a new consortium blockchain framework for MCS, aiming to assure high reliability in complex environments, where a novel Credit-based Proof-of-Work (C-PoW) algorithm is developed to relieve the complexity of POW while keeping the reliability of blockchain; the present invention proposes a new scalable Deep Reinforcement learning based Computation Offloading (DRCO) method to handle the computation-intensive tasks of C-PoW; through combing Proximal Policy Optimization (PPO) and Differentiable Neural Computer (DNC), the DRCO can efficiently make the optimal/near-optimal offloading decisions for C-PoW tasks in blockchain-enabled MCS systems; extensive experiments demonstrate that the DRCO reaches a lower total cost (weighted sum of latency and power consumption) than state-of-the-art methods under various scenarios.

DETAILED DESCRIPTION OF THE EMBODIMENTS

Figure 1:
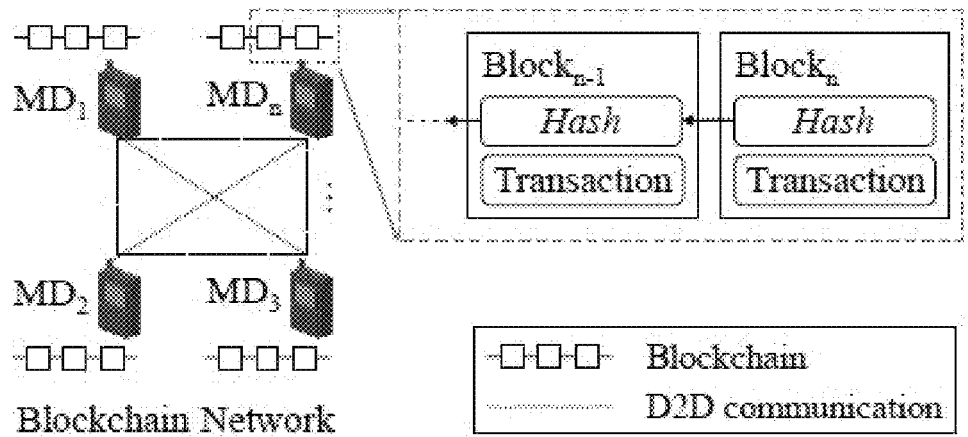
FIG. 1 shows the blockchain-based framework for secure transactions in MCS.

The technical solution of the present invention is described in detail in combination with the accompany drawings.

1. The Main Work of the Present Invention

In the present invention, a new Credit-based Proof-of-Work (C-PoW) algorithm is first designed to replace PoW. In C-PoW, MCS participants with higher credit, where the credit depends on their contributions to MCS sensing tasks, can enjoy a greater probability of successfully appending a block to the blockchain after verification. This also allows their MDs consuming fewer resources to resolve POW with lower difficulty. Therefore, the proposed C-PoW can effectively motivate MCS participants to complete the sensing tasks, simplify the computational complexity of PoW, and maintain the high reliability of transactions on the blockchain network. Although the C-PoW can help save computational resources to some extent, it is still infeasible to process the computation-intensive tasks of C-PoW entirely by MDs with their limited computational capacity.

By deploying resources at the network edge, mobile edge computing (MEC) effectively decrease service latency and network congestion. Therefore, one promising solution is to offload the computation-intensive tasks of C-PoW to edge servers for execution. Because they possess the powerful computational capability to process the C-PoW tasks. However, most of the classic offloading approaches have focused on threshold-based strategies, game theory, or heuristics. These classic methods usually target specific scenarios and set objective functions. They may work well in static and simple scenarios, but it is difficult for them to fit in complex and dynamic MCS environments. To address this issue, Reinforcement Learning (RL) has emerged as a bright solution to adaptively optimize offloading policies. Although the existing RL-based methods can address the problem of computation offloading to some extent, they usually utilize the value-based RL (e.g. Q-learning), which may seriously impede their training process when facing a high-dimensional space since it trains deterministic policies via evaluating each action probability for all states. Nevertheless, the number of MDs and their sensing tasks may continue expanding in blockchain-based MCS, and thus the state space might be extremely large. Under such situation, it is difficult for the value-based RL to quickly achieve the optimal result. Moreover, the algorithm may crash when the state space becomes too large. In contrast, the policy-based RL (e.g. policy gradient) directly outputs actions referring to the probability distribution, but the low training efficiency may happen due to the high variance as it estimates the gradient. To address these problems, a Proximal Policy Optimization (PPO) algorithm with low-variance and high-efficiency features was proposed in [1]. In light of these advantages, we propose a new scalable Deep Reinforcement learning based Computation Offloading (DRCO) method, through integrating PPO and Differentiable Neural Computer (DNC), in order to achieve effective offloading for computation-intensive C-PoW in blockchain-based MCS systems. The main contributions of this work are summarized as follows.

We design a new consortium blockchain-based framework to guarantee secure transactions in MCS systems. It is noted that the difficulty of POW grows as the number of MDs increases. This mechanism restricts the number of new blocks in unit time and reduces the conflicts among MDs when new blocks are added to the blockchain simultaneously. Therefore, the proposed framework can keep high reliability in complex environments with many MDs.

We develop a novel Credit-based Proof-of-Work (C-PoW) algorithm to replace PoW. The C-PoW can effectively incentivize MCS participants to contribute to the sensing tasks, reduce the computational complexity of PoW, and maintain the high reliability of the blockchain. By evaluating participants' credit based on their contributions to sensing tasks, the C-PoW can dynamically adjust the difficulty of PoW tasks according to their credit before verifying new blocks.

We propose a new scalable Deep Reinforcement learning based Computation Offloading (DRCO) method to handle the computation-intensive tasks of C-PoW. Notably, by integrating PPO and DNC, the DRCO can execute differentiable read-write operations on structured external memories by following an objective-oriented way. Moreover, the DRCO uses a clipped surrogate objective to control the update of offloading policy, improving the decision-making efficiency. Besides, the DNNs used in the DRCO can well address the problem of high-dimensional state space.

Extensive experiments are conducted to evaluate the effectiveness of our proposed DRCO method in blockchain-based MCS systems. The results show that the DRCO can reach a lower total cost (weighted sum of latency and power consumption) than state-of-the-art methods under various scenarios.

The rest of this paper is organized as follows. Section 2 reviews the related work. In Section 3, the proposed consortium blockchain-based framework with C-PoW is introduced. Section 4 describes the proposed offloading model. In Section 5, we discuss the DRCO method in detail. Section 6 conducts extensive experiments to evaluate our proposed framework. Finally, we conclude this paper in Section 7.

2. Related Work

Both security issues in MCS and computation offloading in MEC have attracted many research interests. In this section, we review and compare the related work.

2.1. Security Issues in MCS

MCS provides an effective way of data collection and service provisioning between service providers and users, which entails a lot of reliable security measures. For example, Xu et al. proposed a privacy-preserving method with truth discovery, in order to handle the condition when users are off-line in MCS systems. Referring to the ranking deviations between the encrypted sensing data and aggregated results, a reputation updating approach was developed in [2] for preserving the privacy of MCS participants. Bhattacharjee et al. solved the generation of false contributions in MCS by using an event-trust and user-reputation model, which separated different types of users and reduced incentive losses. A Dynamic Trust Relationships aware data Privacy Protection (DTRPP) mechanism was designed in [3] to defend data privacy in MCS with evaluating the trust degrees of public keys. Lin et al. designed two frameworks for auction-based incentive mechanisms in privacy preserving MCS that can reduce the social cost. According to the geographic information and trust levels of users, the authors in [4] offered a privacy-preserving strategy for guaranteeing the precise task allocation. Through integrating the reputation model with cryptographic technologies, a trustworthy and privacy-aware MCS system was designed in [5] without a trusted third party. Based on the homomorphic Paillier encryption, Zhang et al. proposed two reliable and privacy-preserving truth discovery solutions for different MCS scenarios with stable and movable users. Generally, most of the existing work concentrated on the privacy-preserving problem in MCS systems by evaluating the trust degree or reputation of MCS participants.

Different from the above work, our concern is to guarantee the security of transactions between service providers and MCS participants, which is the basis for the normal running of MCS systems. For this purpose, we propose a new consortium blockchain-based framework to secure payment transactions in MCS. Our detailed design is given in Section 3.

2.2. Computation Offloading in MEC

MEC provides powerful computational capacity at the network edge, which can help decrease service latency and network congestion. As one key technology enabled by MEC, computation offloading has received many research concerns. For instance, You et al. first defined the computation offloading in MEC as a convex optimization problem, and then they used a threshold-based structure with an offloading priority function. Moreover, a two-tier greedy approach was developed for making offloading decisions in ultra-dense IoT networks. Chen et al. used a game-theoretic method to address the multiple resources allocation issue in MEC, and then proved that it can converge to a Stackelberg equilibrium. Sundar and Liang proposed an Individual Time Allocation with Greedy Scheduling (ITAGS) method, in order to optimize offloading decisions with the constraint on completion deadline. Based on the game theory, a collaborative offloading mechanism was designed, which utilized the computational resources from both the remote cloud and MEC. Generally, most of classic methods concentrated on threshold-based strategies, heuristics, or game theory. They commonly construct their optimization objective functions based on the firm assumption of a specific scenario. Therefore, they might work well in a static and simple scenario, but it is difficult for them to realize good adaptiveness when it comes to the complex and dynamic MCS environment.

As an advanced decision-making approach, Reinforcement Learning (RL) provides a new direction for dealing with the offloading issue in complex and dynamic MEC environments. For example, a Q-learning based offloading mechanism was designed in [6], in order to find a long-term optimal policy with the maximized utility of mobile users. Li et al. applied a deep Q-networks (DQN) algorithm to the offloading problem for reducing the processing delay and energy consumption on users' devices. Similarly, a DQN-based offloading approach was developed in [7] for an energy-harvesting MEC system to optimize the costs of latency and energy consumption. In general, most of these solutions have relied on the valued-based RL algorithms. They might not be able to effectively obtain an optimal offloading policy in the complex MCS environment with many MDs, because the high-dimensional state space may not only hinder their training process but also cause the algorithm crashed if the state space is too large. Although there is fewer studies utilizing the actor-critic RL for computation offloading, it would be hard for them to determine the step size of updating offloading policies. This issue may also severely affect the learning efficiency of RL-based methods.

Distinguished from the existing work, we introduce the advantage of MEC into MCS and propose a novel DRCO method, aiming to efficiently obtain the optimal offloading policy in the complex and dynamic environment of blockchain-based MCS systems.

3. Consortium Blockchain with C-PoW for Secure Transactions in MCS

Blockchain was developed to handle the consensus problem on the Bitcoin network. When a transaction is stored in a block, the block can only be appended to the blockchain after completing a PoW task and verified by other users. Therefore, Blockchain offers a reliable mechanism to ensure that transactions are consistent, unique, and cannot be falsified. Distinguished from the public blockchain, the consortium blockchain only permits the authorized nodes (i.e.

the MDs of MCS participants) to maintain the consensus process. For this reason, the consortium blockchain is adopted in the proposed MCS systems. FIG. 1 illustrates the proposed consortium blockchain-based framework for secure transactions in MCS systems, where a transaction is first added by an MD to a new block. After the new block is done, it is broadcasted to other MDs on the blockchain network. Next, this new block is received and verified (e.g. by digital signatures) by each of the other MDs with the concerns of security and data integrity. Once passing the verification, it will be finally added to the blockchain maintained by the MDs; otherwise, it will be dropped. When an MD successfully appends a new block, it will obtain a certain reward. This process is called the mining in Blockchain, ensuring the decentralized security.

There is only one blockchain that is maintained, but MDs may generate different new blocks simultaneously. Hence, MDs must choose the same new block to be appended. Nevertheless, it is hard to formulate a uniform selection criterion since different new blocks owns equality and non-priority. In light of the classic blockchain, the number of new blocks is restrained in unit time. Once an MD feeds a transaction into a new block, the MD must complete some extra work before it broadcasts the new block. This process is described as follows.

Step 1: The contents of $Block_n$ are transferred to a string, denoted by $Str_n$=SHA256 ($Block_{n-1}$−1)+the basic information of $Block_n$+the transactions in $Block_n$. Each block owns a one-to-one correspondence with SHA256( ) value, a cryptographic hash function, to make index. As illustrated in FIG. 1, $Block_n$ contains the SHA256( ) value of the contents in $Block_{n-1}$. Therefore, the SHA256( ) value is used to connect blocks in order.

Step 2: A random value nonce is appended to $Str_n$ to form a new string, denoted by $Str'_n$=$Str_n$+nonce. Next, $Str'_n$ is added to SHA256( ) to get a 256-bit binary value. As described in Eq. (1), if the binary value is smaller than the target, which indicates the mining difficulty, the extra work is completed successfully. We propose that the difficulty of mining, denoted by D, increases as the number of MDs grows, and thus avoid the conflicts if MDs tend to append blocks simultaneously.

$$\text{Find nonce s.t. } SHA256(Str'_n) < \text{target}, \tag{1}$$

where target=$2^{(256-D)}$−1, and D=$D_{base}$+lg(m). $D_{base}$ represents the predefined basic difficulty of mining (0≤D base≤255), and m is the number of MDs. For an edge environment with a single server, the expected computational resources for processing mining tasks are much lower than that in the traditional Bitcoin mining. Therefore, the value of $D_{base}$ is accordingly set to 32, which means that the expected probability of finding eligible nonce is $½^{32}$. In average, each MD needs to complete a task with the computation cost that is around $2^{32}$ hashes. Moreover, the logarithm is used to reduce the scale of variables while maintaining the data correlation, and thus lg(m) ensures that the difficulty of mining can smoothly increase as the number of MDs grows. Therefore, the blockchain-based framework guarantees high reliability in complex scenarios.

As the extra work, the PoW has been proved to be a mathematical puzzle that is super difficult to be resolved but easy to be verified. Thus, massive computational resources are needed to complete the computation-intensive PoW. Consequently, it obstructs applying the blockchain for secure transactions in MCS systems since MDs are equipped with limited computational resources. To relieve this problem, we first develop a new Credit-based Proof-of-Work (C-PoW) algorithm to replace PoW on the blockchain network. The C-PoW aims to reduce the computational complexity of PoW and guarantee the high reliability of the blockchain network. In the proposed C-PoW, we define the user credit (VC) to evaluate the contributions of participants to MCS sensing task. Specifically, VC is positively correlated to the amount of valid uploaded data. Therefore, the VC of an MCS participant for a sensing task is defined as $$VC_n = 1 + \frac{V_n}{V_{total}}, \tag{2}$$

where $V_n$ and $V_{total}$ are the amount of valid data uploaded from $MD_n$ and the total amount of data required for a sensing task, respectively. Notably, $VC_n$ only works for one sensing task and cannot be accumulated for other different sensing tasks. When the sensing task is completed or changed, the corresponding $V_n$ needs to be recalculated.

Through introducing VC into the mining process, the PoW in Eq. (1) is modified as follows.

$$\text{Find nonce s.t. } SHA256(Str'_n) < VC_n \cdot \text{target}. \tag{3}$$

Following the proposed C-PoW, if a participant contributes more to an MCS sensing task, it will obtain higher VC and the mining difficulty will be relieved slightly. Otherwise, the participant cannot enjoy special treatment as it processes the PoW task. Meanwhile, higher credit leads to higher priority of broadcasting and verifying especially when many participants tend to append blocks. These advantages actuate participants to make more contributions to MCS sensing tasks and the global consensus. Therefore, with the C-PoW, not only the enthusiasm of MCS participants is mobilized but also the high reliability of the blockchain network is guaranteed.

However, it might be still infeasible to fully execute C-PoW tasks locally with the limited computational capacity of MDs, although the proposed C-PoW can help save computational resources to some extent. To further address this issue, we propose to offload C-PoW tasks to edge servers for execution, as described in detail below.

4. System Model and Problem Formulations

We design a offloading model to reduce the cost of processing C-PoW tasks in blockchain-based MCS systems. For clarity, we consider a single-edge scenario, which consists of one edge server with one base stations (BSs), and a set of MDs, donated by MD={$MD_1$, $MD_2$, . . . , $MD_m$}, where m represents the number of MDs. Besides, the bandwidth is equally shared by MDs. When an MD finish an MCS transaction, the transaction will be stored to a block and it is tended to be appended to the blockchain. For this purpose, the MD should process a C-PoW task, and the block will be broadcast and verified by other MDs.

TABLE 1

Major notations in the proposed model

| Notation | Definition |
| --- | --- |
| $MD_n$ | Mobile device n |
| $T_n$ | Task n to be processed by $MD_n$ |
| $D_n$ | Size of input data of $T_n$ |
| $U_n$ | Computational resources needed to complete $T_n$ |
| E | Computational capacity of an edge server |
| $e_n^{local}$ | Computational capacity of $MD_n$ |
| $L_n^{local}$ | Latency of processing $T_n$ in Local Mode |
| $P_n^{local}$ | Power consumption of processing $T_n$ in Local Mode |
| $C_n^{local}$ | Cost of completing $T_n$ in Local Mode |
| $L_n^{edge,t}$ | Latency of transmitting $D_n$ in Edge Mode |
| $r_n$ | Uplink rate of $MD_n$ in a wireless channel |
| $P_n^{edges}$ | Power consumption of transmitting $D_n$ in Edge Mode |
| $P_n^{trans}$ | Transmission power of $MD_n$ |
| $L_n^{edge,p}$ | Latency of processing $T_n$ in Edge Mode |
| $e_n^{edge}$ | Allocated edge computational resources to process $T_n$ |
| $P_n^{edge,p}$ | Power consumption of processing $T_n$ in Edge Mode |
| $P^{server}$ | Processing power of an edge server |
| $P_n^{idle}$ | Idle power of $MD_n$ |
| $L_n^{edge}$ | Latency of completing $T_n$ in Edge Mode |
| $P_n^{edge}$ | Power consumption of completing $T_n$ in Edge Mode |
| $C_n^{edge}$ | Cost of completing $T_n$ in Edge Mode |
| $C^{total}$ | Total cost of the proposed offloading mode |

A C-PoW task to be processed by $MD_n$ ($1 \leq n \leq m$) is defined as a 2-tuple, denoted by $T_n = \langle D_n, U_n \rangle$. $D_n$ indicates the size of input data (contents of a block), and it is also input to SHA256( ). $U_n$ indicates the computational resources needed (i.e. CPU cycles) to process $T_n$, positive to the hashes for achieving the qualified value of SHA256( ), where the calculating speed is one hash per CPU cycle. Moreover, the computational capacity of an edge server and an MD are denoted by E and $e_n^{local}$, respectively. Table 1 illustrates the major notations in the proposed model.

The edge server and MDs offers computing services for C-PoW tasks that can be processed locally or offloaded for execution. Therefore, two modes are defined as follows.

Local Mode: When $T_n$ is processed locally, the latency generated by $MD_n$ is defined as $$L_n^{local} = \frac{U_n}{e_n^{local}}. \tag{4}$$

The power consumption of processing $T_n$ is defined as $$P_n^{local} = \psi \cdot (e_n^{local})^2 \cdot U_n, \tag{5}$$

where $\psi$ is the power parameter for each CPU cycle.

As there is large difference between the value range of $L_n^{local}$ and $P_n^{local}$, it would be hard to weight them for balancing latency and power consumption. To address this problem, $L_n^{local}$ and $P_n^{local}$ are normalized into the same-scale values, donated by [a, b], where $a = avg(min(L_n^{local}), min(P_n^{local}))$ and $b = avg(max(L_n^{local}), max(P_n^{local}))$. This simplifies the process of weighting the latency and power consumption in the proposed model and accelerate the convergence of our algorithms. The normalization equation is given by $$x' = a + \mathcal{N}^* \cdot (x - min(\mathcal{X})), \tag{6}$$

where x is the input data (e.g. $L_n^{local}$ or $P_n^{local}$) and x' is the output value after normalization (e.g. $(L_n^{local})'$ or $(P_n^{local})'$).

$$\mathcal{N}^* = \frac{b-a}{max(x) - min(x)}$$

is the normalization coefficient. max(X) and min(X) are the maximum and minimum values of the sample data X (e.g. $\mathcal{X} = (L_1^{local}, L_2^{local}, \ldots, L_n^{local})$).

After normalization, we define the cost of completing the task $T_n$ in Local Mode as $$C_n^{local} = \theta \cdot (L_n^{local})' + (1-\theta) \cdot (P_n^{local})'. \tag{7}$$

where $\theta$ ($0 \leq \theta \leq 1$) is used to weight different items.

Edge Mode: When $T_n$ is offloaded for processing, the procedure is given as follows.

Step 1: $MD_n$ uploads the input data $D_n$ to an edge server via a wireless channel. Thus, we define the corresponding transmission latency that happens in $MD_n$ as $$L_n^{edge,t} = \frac{D_n}{r_n}, \tag{8}$$

where $r_n$ is the uplink rate of $MD_n$.

The corresponding power consumption of $MD_n$ is defined as $$P_n^{edge,t} = P_n^{trans} \cdot L_n^{edge,t}, \tag{9}$$

where $P_n^{trans}$ is the transmission power of $MD_n$.

Step 2: The edge server allocates computational resources and processes $T_n$. Here, we define the latency of processing $T_n$ as $$L_n^{edge,p} = \frac{U_n}{e_n^{edge}}, \tag{10}$$

where $e_n^{edge}$ represents the allocated computational resources to process $T_n$, and $\sum_1^m e_n^{edge} \leq E$.

The corresponding power consumption is defined as $$P_n^{edge,p} = (P^{server} + P_n^{idle}) \cdot L_n^{edge,p}, \tag{11}$$

where $P^{server}$ and $P_n^{idle}$ are the power of the edge server and the idle power of $MD_n$, respectively.

where $P^{server}$ and $P_n^{idle}$ are the power of the edge server and the idle power of $MD_n$, respectively.

Step 3: $MD_n$ downloads the result of task $T_n$. The result is nonce that meet target of C-PoW. Because the data size of nonce is small, the downloading costs are neglectable. Similarly, with Eq. (6), we can get the cost of completing the task $T_n$ in Edge Mode as $$C_n^{edge} = \theta \cdot (L_n^{edge})' + (1-\theta) \cdot (P_n^{edge})', \quad (12)$$

where θ is defined in Eq. (7). Moreover, the latency and power consumption of completing the task $T_n$ in Edge Mode can be calculated by Eq. (13).

$$L_n^{edge} = L_n^{edge,t} + L_n^{edge,p}, \quad P_n^{edge} = P_n^{edge,t} + P_n^{edge,p}, \quad (13)$$

By combining the cost of these two modes, the total cost with different offloading decisions can be calculated as $$C^{total} = \sum_1^m \left( (1-a_n) \cdot C_n^{local} + a_n \cdot C_n^{edge} \right), \quad (14)$$

where $a_n = \{0, 1\}$ indicates the offloading decision of $MD_n$. Moreover, $C_n^{local}$ and $C_n^{edge}$ are the cost of completing the task $T_n$ in Local Mode and Edge Mode, respectively.

5. DRL-Based Offloading Decision-Making

Figure 2:
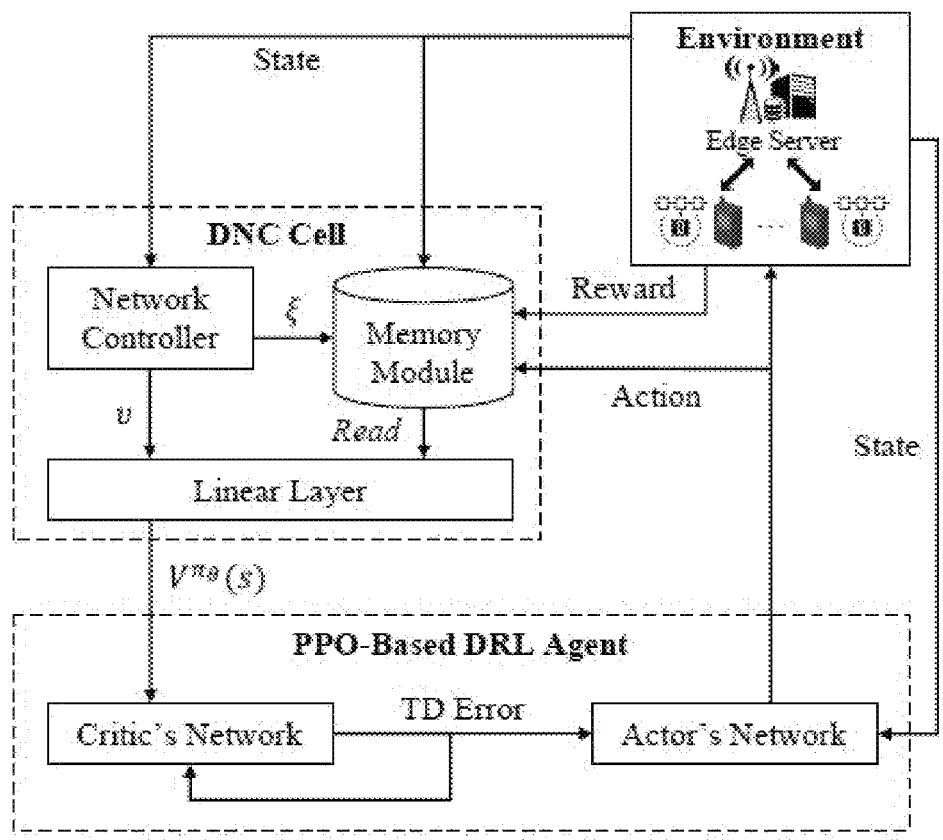
FIG. 2 shows the DRCO method for blockchain-based MCS systems.

This section presents the proposed Deep Reinforcement learning based Computation Offloading (DRCO) method. The DRCO can be used to obtain the optimal offloading in block-chain-based MCS systems. As illustrated in FIG. 2, a offloading scenario in blockchain-based MCS systems is regarded as the environment, and the Deep Reinforcement Learning (DRL) agent selects actions by communicating with the environment. Specifically, the state space, action space and reward function for DRCO are defined as follows.

State space: The state contains four parts, including the set of C-PoW task (denoted by T), set of the computational capacity of MDs (denoted by $\varepsilon^{local}$), available computational capacity of the edge server (denoted by $E^{avail}$), and network status (denoted by O), where $T=\{T_1, T_2, \ldots, T_m\}$, $\varepsilon^{local}=\{e_1^{local}, e_2^{local}, \ldots, e_m^{local}\}$, $E^{avail}=E-\Sigma_1^m e_n^{edge}$, and O contains the bandwidth and uplink rate of each MD. It is defined as a 4-tuple, denoted by $S=<T, \varepsilon^{local}, E^{avail}, O>$, considering the task overhead, system resource, and network status.

Action space: The DRL agent takes offloading actions for C-PoW tasks. It is defined as $A=\{a_n | a_n \in \{0, 1\}, 1 \leq n \leq m\}$, which indicates the binary offloading decision for each MD. If $a_n=1$, the task $T_n$ is processed by $MD_n$ locally. Otherwise, $T_n$ is offloaded for execution.

Reward function: The reward function guides the DRL agent to learn the optimized policy, aiming to minimize the total cost of computation offloading. Thus, it is negatively-correlated to the total cost (denoted by $C^{total}$) after making offloading decisions, which is defined as $$\mathcal{R} = 1 - \frac{C^{total}}{\sum_1^m C_n^{local} + \sum_1^m C_n^{edge}}, \quad (15)$$

where $$\sum_1^m C_n^{local} \text{ and } \sum_1^m C_n^{edge}$$

indicate the cost when all C-PoW tasks are processed by MDs or the edge server, respectively, which are used to normalize $C^{total}$.

The DRL agent first selects an offloading action based on the current state. Accordingly, a reward is feedback from the environment and state goes to the next. We formulate it as a Markov decision process (MDP). As it is infeasible to create an accurate mathematical model for solving such offloading problems with dynamics and uncertainty, a model-free RL is used in the proposed DRCO method. In more detail, Proximal Policy Optimization (PPO) is used to train DNNs for optimizing offloading policies. PPO is an actor-critic based RL, combining the value-based RL (i.e. critic) and policy-based RL (i.e. actor). Specifically, the variance of policy gradient is effectively reduced by using the critic, because the critic can guide the actor to optimize policies. Furthermore, through integrating DNNs, the DRCO method can well handle the high-dimensional state space. The key steps of the DRCO method are given in Algorithm 1. First, we initialize the actor's network $V^{\pi\theta}$ and critic's network $Q^{\pi\theta}$. Also, the actor's and critic's learning rate $\gamma_a$ and $\gamma_c$, reward decay rate λ, TD error discount factor β, mini-batch size α, and memory module M in the DNC cell are initialized. After initializing the state, we start the training epochs for the DRCO.

In each training epoch, the environment is first refreshed. Next, the offloading actions for C-PoW tasks are selected on the current state. Next, the reward is calculated after executing the offloading actions, and the environment steps to the next state. During the training process, sample trajectories are stored in the memory M. Next, policy parameters are updated by mini-batch. The training of DRCO is based on the policy gradient algorithm with the gradient estimator as $$\nabla_{\theta_t} J(\theta_t) = E_{\pi_{\theta_t}} \left[ \nabla_{\theta_t} \log \pi_{\theta_t}(\mathcal{S}_t, \mathcal{A}_t) Q^{\pi_{\theta_t}}(\mathcal{S}_t, \mathcal{A}_t) \right], \quad (16)$$

where $$E_{\pi_{\theta_t}}$$

is the empirical average, $$\pi_{\theta_t}$$

is the offloading policy, and $$Q^{\pi_{\theta_t}}$$

is the action-value function.

In each mini-batch, the discounted rewards of recent actions are first calculated. Next, we reduce the gradient variance by using an advantage function, denoted by $$AF^{\pi_{\theta_t}},$$

where $V^{\pi\theta}$ is the state-value function. Next, we optimize $$AF^{\pi_{\theta_t}}$$

by minimizing the loss of the critic's network (denoted by $$\text{(denoted by } L^{critic}(\theta_t) = E_{\mathcal{M}}(\delta^{\pi_{\theta_t}})^2\text{)},$$

where $$\delta^{\pi_{\theta_t}} = \mathcal{R}_t + \beta V^{\pi_{\theta_{t+1}}}(S_{t+1}) - V^{\pi_{\theta_t}}(S_t).$$

---

Algorithm 1: The proposed Deep Reinforcement learning based Computation Offloading (DRCO) method

---

1  Initialize: $V^{\pi\theta}$ and $Q^{\pi\theta}$.
2  Initialize: $\gamma_a, \gamma_c, \lambda, \beta, \alpha$, and $\mathcal{M}$.
3  Receive the initial state $S_0$, where $S_0$ = env.reset( );
4  for training epoch t = 0, 1, 2, ..., $N$ do
5  | Refresh the environment: env.render( );
6  | Select offloading actions $\mathcal{A}_t$ (defined in action
   |   space) on the current state $S_t$:
   |   $\mathcal{A}_t$ = actor.choose_action($S_t$);
7  | Execute $\mathcal{A}_t$, receive the reward $\mathcal{R}$ t (calculated
   |   by reward function) and next state $S_{t+1}$ :
   |   $\mathcal{R}_t, S_{t+1}$ = env.step($\mathcal{A}_t$);
8  | Store sample trajectories in $\mathcal{M}$ :
   |   replay_memory.push($S_t, \mathcal{A}_t, \mathcal{R}_t, S_{t+1}$);
9  | Update the offloading policy $\pi_{\theta_t}$ by mini-batch:
10 | if t % a == 0 then
11 | | Calculate the discounted rewards of recent
   | |   offloading actions:
   | |   $\mathcal{R}_{disc} = \mathcal{R}_{t-a} + \lambda \mathcal{R}_{t-a+1} + ... + \lambda^{a-1} \mathcal{R}_{t-1}$:
12 | | Call the network controller in the DNC cell
   | |   to operate the memory module, and output
   | |   the estimation of the state-value function:
   | |   $V^{\pi_{\theta_t}}(S_t) = \upsilon + W_R \cdot \text{Read}$
13 | | Calculate the advantage function in the
   | |   critic, where $Q^{\pi_{\theta_t}}(S_t, \mathcal{A}_t) = \mathcal{R}_{disc}$ :
   | |   $AF^{\pi_{\theta_t}}(S_t, \mathcal{A}_t) = Q^{\pi_{\theta_t}}(S_t, \mathcal{A}_t) - V^{\pi_{\theta_t}}(S_t)$;
14 | | Minimize the loss function for optimizing
   | |   the advantage function with the learning
   | |   rate $\gamma_c$:
   | |   $\min(E_{\mathcal{M}}(\mathcal{R}_t + \beta V^{\pi_{\theta_{t+1}}}(S_{t+1}) - V^{\pi_{\theta_t}}(S_t))^2)$;
15 | | Calculate and minimize the clipped
   | |   surrogate objective $L^{CLIP}(\theta_t)$ for
   | |   optimizing the offloading decisions in
   | |   actor with the learning rate $\gamma_a$: $L^{CLIP}(\theta_t)$ =
   | |   $E_{\pi_{\theta_t}}[\min(r(\theta_t) AF^{\pi_{\theta_t}}(S_t, \mathcal{A}_t), \text{clip}(r(\theta_t), 1-\epsilon, 1+\epsilon) AF^{\pi_{\theta_t}}(S_t, \mathcal{A}_t))]$;
16 | end
17 | Update the state: $S_t = S_{t+1}$:
18 end

---

Furthermore, the gradient estimator can be obtained by differentiating the objective function of policy gradient as $$J(\theta_t) = E_{\pi_{\theta_t}}[\log \pi_{\theta_t}(S_t, \mathcal{A}_t) AF^{\pi_{\theta_t}}(S_t, \mathcal{A}_t)]. \quad (17)$$

However, it is hard to effectively estimate $$V^{\pi_{\theta_t}}(S_t)$$

by using a function approximator when using a simple replay memory. Meanwhile, redundant data would be introduced if the memory stores all states. To solve this issue, we integrate PPO and DNC to enhance the scalability and efficiency of learning the optimal policy. As shown in FIG. 2, the DNC cell adopts a network controller to control the reading and writing in memory, enabling the DRL agent to be optimized via an objective-oriented way. More specifically, the network controller (constructed by DNN) first receives the system state from the environment. Meanwhile, the memory module stores the state and reward from the environment, and the action from the actor's network, respectively. Next, the interface vector $\xi$ is generated to parameterize the interactions between the network controller and memory module, which ensures that the memory module is updated in the correct domain for approaching the optimal offloading policies. Finally, through concatenating the output vector v of the network controller and the read vector Read of the memory module, the final output of the DNC cell is calculated in a linear layer as follows.

$$V^{\pi\theta_t}(s) = \upsilon + W_R \cdot \text{Read}. \tag{18}$$

where $W_R$ is the weight matrix of the linear layer.

In the DNC cell, a differentiable attention mechanism determines the locations that contain read or write operations in the memory module, where weightings are trained to make decisions for executing these operations. Therefore, a read vector can be defined as follows.

$$\text{Read} = \omega^r \cdot \mathcal{M}^\top. \tag{19}$$

where the read weight $w^r$ is used to calculate the weighted averages over the contents of locations, and M indicates the current status of the memory matrix.

Moreover, the write operation is a combination of the write weight $w^w$, an erase vector e, and a write vector Write. Thus, the memory matrix M can be updated by the following write operation.

$$\mathcal{M} = \mathcal{M}' \cdot (1 - w^w \cdot e^\top) + w^w \cdot \text{Write}^\top. \tag{20}$$

where the vectors e and Write are the components of interface vector $\xi$, and M' represents the status of the memory matrix at the last timestep.

With the effective memory operations provides by the DNC cell, an efficient $$V^{\pi\theta_t}(s)$$

estimation can be obtained for the critic's network in the PPO-based DRL agent.

The gradient estimator is then modified as $$\nabla_{\theta_t} J(\theta_t) = E_{\pi_{\theta_t}} \left[ \nabla_{\theta_t} \log \pi_{\theta_t}(s, a) AF^{\pi\theta_t}(\mathcal{S}_t, \mathcal{A}_t) \right]. \tag{21}$$

Further, this gradient estimator can be calculated by differentiating the following objective function of policy gradient, $$L^{PG}(\theta_t) = J(\theta_t) = E_{\pi_{\theta_t}} \left[ \log \pi_{\theta_t}(\mathcal{S}_t, \mathcal{A}_t) AF^{\pi\theta_t}(\mathcal{S}_t, \mathcal{A}_t) \right]. \tag{22}$$

However, it is hard to decide the step size of updating policy in policy gradient subject to heavy debugging work of hyper-parameters. To solve this issue, we utilize Kullback-Leibler (KL) divergence to restrict the differences between the old and new policy to a certain value $\xi$ (i.e., the trust region) in Eq. (23). Thus, not only the learning process can be accelerated by using larger step sizes but also the objective function can be optimized within the trust region.

$$\underset{\theta_t}{\text{maximize}}\ E_{\pi_{\theta_t}} \left[ \frac{\pi_\theta(\mathcal{S}_t, \mathcal{A}_t)}{\pi_{\theta_{old}}(\mathcal{S}_t, \mathcal{A}_t)} AF^{\pi\theta_t}(\mathcal{S}_t, \mathcal{A}_t) \right], \tag{23}$$

$$\text{s.t.}\ E_{\pi_{\theta_t}} \left[ KL[\pi_{\theta_{old}}(\mathcal{S}_t), \pi_{\theta_t}(\mathcal{S}_t)] \right] \le \xi$$

where $\theta_{old}$ represents the old policy.

Following the above formula, the old policy is first used for data sampling (i.e., state, action, and rewards) in the environment. Next, random sampling is performed on these data to obtain the mini-batch for optimizing the policy. However, a second derivative is needed to be executed for estimating the constraint. If the independent variables of the objective function are with high dimensionality, the computational complexity would be high (i.e., $O(n^2)$). To address this problem, we optimize the efficiency of data sampling through using the first derivative with a clipped surrogate objective as $$L^{CLIP}(\theta_t) = \tag{24}$$

$$E_{\pi_{\theta_t}} \left[ \min(r(\theta) AF^{\pi\theta_t}(\mathcal{S}_t, \mathcal{A}_t), \text{clip}(r(\theta_t), 1-\epsilon, 1+\epsilon) AF^{\pi\theta_t}(\mathcal{S}_t, \mathcal{A}_t)) \right],$$

$$\text{where } r(\theta_t) = \pi_\theta((\mathcal{S}_t, \mathcal{A}_t)/\pi_{\theta_{old}}(\mathcal{S}_t, \mathcal{A}_t).$$

Through using the clip function, the cases that $r(\theta_t)$ leave the interval $[1-\varepsilon, 1+\varepsilon]$ would be eliminated, which also means that the changes of $r(\theta)$ would be omitted (i.e., clipped to the interval $[1-\varepsilon, 1+\varepsilon]$) when $r(\theta_t)$ makes the objective function optimized to a certain extent. Therefore, there is no need to calculate the second derivative with low efficiency of data sampling and high complexity of choosing hyper-parameters.

Referring to the critic's evaluation, the actor can optimize the clipped surrogate objective $L^{CLIP}(\theta_t)$ with low variance by using the advantage function $$AF^{\pi\theta_t}(\mathcal{S}_t, \mathcal{A}_t).$$

With the help of the clipped surrogate objective $L^{CLIP}(\theta_t)$, the efficiency of data sampling and the decision making of step size can be greatly improved. Finally, the environment updates its current state to the next one and goes to the subsequent episode.

6. Experiments and Discussion

In this section, we conduct extensive experiments for performance evaluation and make comparison with state-of-the-art methods.

Also, the actor's and critic's learning rate ya and yc, reward decay rate $\lambda$, TD error discount factor $\beta$, mini-batch size $\alpha$, and memory module M in the DNC cell are initialized. After initializing the state, we start the training epochs for the DRCO.

6.1. Simulation Settings

We simulate an edge scenario that consists of an edge server with a BS. The radius of BS coverage is 250 m and the network bandwidth is 20 Mbps. The computation capacity of an edge server and an MD are set to 40 GHz and 1 GHZ, respectively. The required volume of data of an MCS sensing task is set as 100 TB, and the volumes of valid data uploaded by users are randomly distributed in [0, 30] TB, where the sum of their uploaded data is equal to 100 TB. Moreover, the size of input data (contents of a block) is limited to 1 MB that is the maximum of a block in Blockchain. The computational resources required (i.e. CPU Gigacycles) to complete C-PoW are positive to the hashes of calculating SHA256( ), where the calculating speed is one hash per cycle and the basic difficulty of C-PoW grows with the increasing number of MDs for guaranteeing high reliability. Furthermore, the processing power of the edge server is set to 250 W, and the transmission power and idle power of an MD are 1 W and 100 mW. Moreover, the same weight of cost is used for latency and power consumption. The DRCO is implemented via TensorFlow. For DNNs, we use 2 hidden layers with 200 and 100 neurons. Besides, the number of training epochs is 1000, reward decay rate 2 is 0.95, mini-batch size α is 100, actor's and critic's learning rate $\gamma_a$ and $\gamma_c$ are 0.0001 and 0.0002, TD error discount factor β is 0.9, size of replay memory M is 500, and clipping constant E is 0.2, respectively.

Furthermore, we evaluate the performance of other offloading schemes including All Local, All Edge, Optimum, Greedy, Q-learning, DQN, and PPO. In All Local and All Edge, all C-PoW tasks are executed by MDs or by an edge server, respectively. The Optimum represents the optimal offloading policy found by exhaustive searching that may result in extremely high complexity. In Greedy, the most beneficial choice is always made based on the current system state without long-term consideration. The Q-learning records each state and its corresponding state-values of taking different actions in a Q-table, which may suffer from the issue of high-dimensional space. The DQN uses DNNs to fit the Q-table and thus does not search in a large table. Different from the proposed DRCO, the PPO does not integrate the DNC.

6.2. Experimental Results

Figure 3:
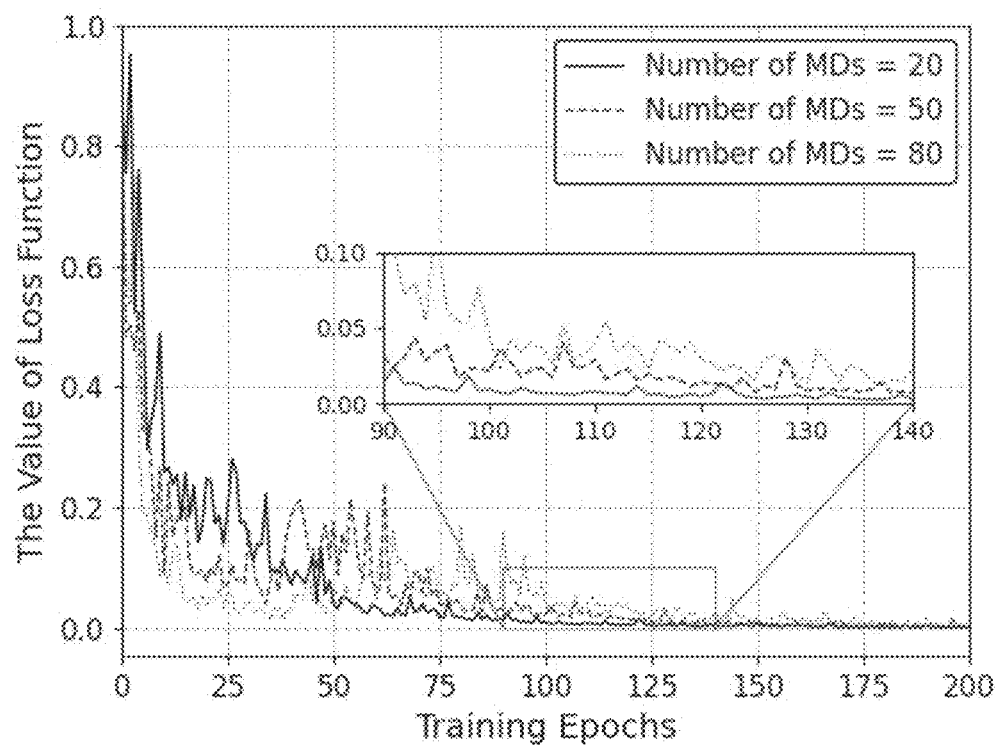
FIG. 3 shows the convergence of the proposed DRCO method.

First, we evaluate the convergence of the DRCO by using its loss function. To efficiently obtain the optimal offloading policy for blockchain-based MCS systems, the loss function needs to be minimized and the learning curve is expected to converge quickly. FIG. 3 illustrates the values of the loss function of the critic's network in each training epoch when the number of MDs grows from 20 to 80. The results show that the DRCO almost converges after about 100 training epochs when the number of MDs is 20. Even though the MCS environment becomes complex with more MDs (i.e. 50 or 80), the DRCO can still promise fast convergence within around 175 epochs. Therefore, the DRCO exhibits excellent training efficiency for different scenarios in blockchain-based MCS systems with various numbers of MDs.

Figure 4:
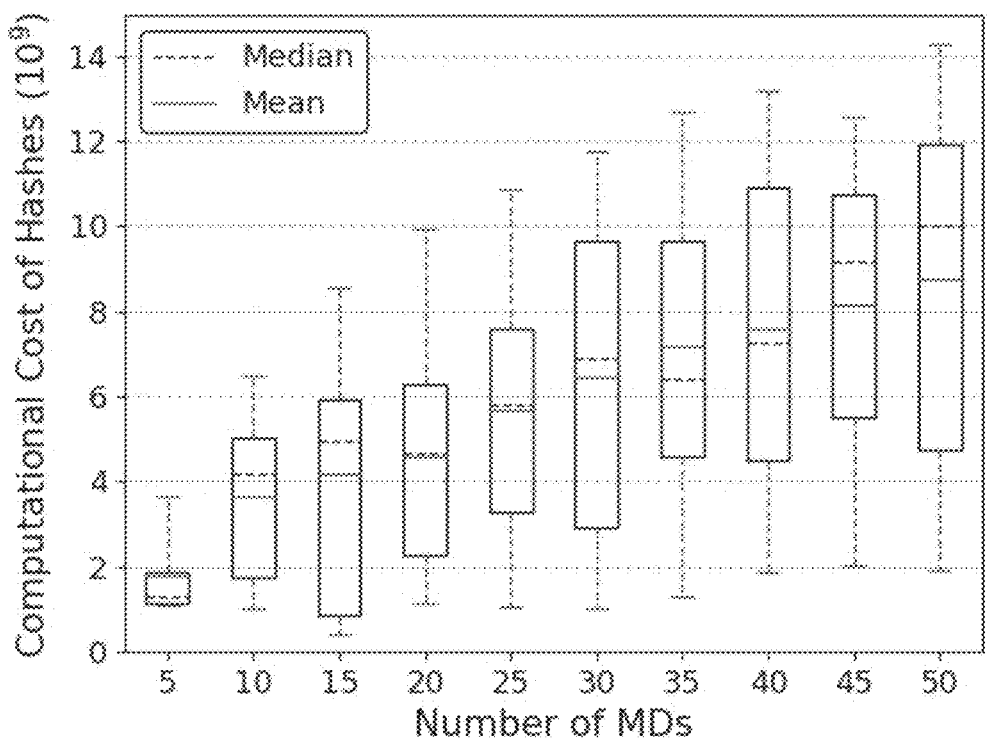
FIG. 4 shows the computational cost of hashes with various numbers of MDs.

Next, we evaluate the effectiveness of the C-PoW for secure transactions in blockchain-based MCS systems. FIG. 4 shows the distribution of hashes (representing the difficulty of C-PoW) with different numbers of MDs, where the computational cost of hashes (measured by the mean value) increases as the number of MDs grows. Therefore, on average, more computational resources should be consumed to complete C-PoW tasks as the number of MDs increases in the proposed blockchain-based MCS systems. This mechanism restricts the new blocks generated in unit time and thus reduces the conflicts among MDs when new blocks are added to the blockchain simultaneously, which maintains the high reliability of the blockchain.

Figure 5:
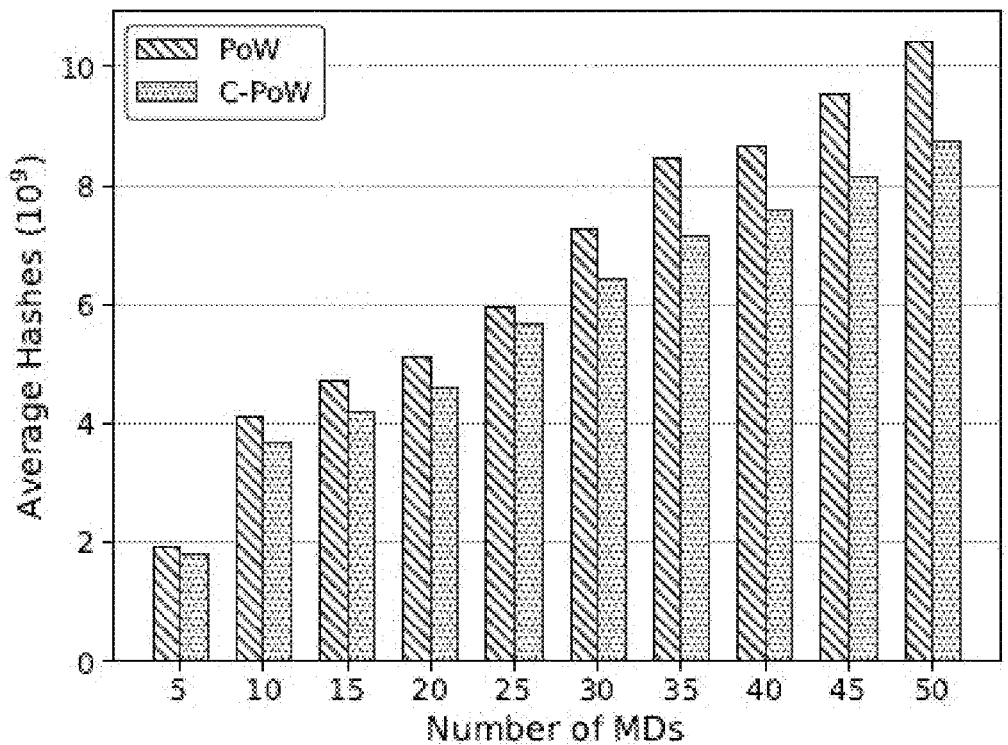
FIG. 5 shows the comparison of computational cost between C-PoW and PoW.

Furthermore, we compare the computational cost of the C-PoW with the classic PoW in our simulation environment. With the consideration of user credit in the C-PoW, MCS participants tend to make contributions to sensing tasks for improving their credit and thus reducing the difficulty of their mining tasks. As shown in FIG. 5, around 5%~20% computational cost of hashes is reduced by using the C-PoW under different scenarios with various numbers of MDs. Moreover, participants can receive certain rewards if they successfully add their new blocks to the blockchain, which also motivates them to join the global consensus on the blockchain network. Therefore, the C-PoW is able to maintain the high reliability of the blockchain network while saving considerable computational resources.

TABLE 2

Total cost of various offloading schemes with different numbers of MDs

| No. of MDs | Total cost ($10^{-3}$) | | | | |
|---|---|---|---|---|---|
| | Optimum | All Local | All Edge | Greedy | DRCO |
| 5 | 0.197 | 1.259 | 0.197 | 0.197 | 0.197 |
| 10 | 1.509 | 5.102 | 1.593 | 1.517 | 1.509 |
| 15 | 3.064 | 8.720 | 4.085 | 3.754 | 3.297 |
| 20 | 6.302 | 12.798 | 7.991 | 7.087 | 6.523 |
| 25 | 11.619 | 19.698 | 15.375 | 12.539 | 11.758 |
| 30 | 16.957 | 26.834 | 25.139 | 18.602 | 17.391 |
| 35 | 24.486 | 34.845 | 38.100 | 26.185 | 24.875 |
| 40 | 30.907 | 42.275 | 52.796 | 32.705 | 31.346 |
| 45 | 39.973 | 50.985 | 71.691 | 41.503 | 40.229 |
| 50 | 49.264 | 60.763 | 94.857 | 51.091 | 49.320 |

Next, Table 2 presents the total cost of various offloading schemes with different numbers of MDs. In general, the total cost increases as the number of MDs grows. As the number of MDs is less than 25, the All Local shows poor performance. This is because only local computational resources of MDs are used this scheme, leading to a high cost. As the number of MDs is over 35, the All Edge performs poorly. Especially, the All Local is about to outperform the All Edge as the number of MDs is 30. Because the All Edge only uses edge resources but the required resources of processing C-PoW have surpassed the edge capacity, which results in excessive latency and power consumption. The performance of the Greedy seems acceptable, but the Greedy might tend to fall into the local optimum since it merely sees instant rewards. Therefore, the Greedy may not well manage the complex scenario and the performance gap between the Greedy and the DRCO become obvious when the number of MDs grows. In contrast, the DRCO always outperforms other offloading schemes and approximates the Optimum with various numbers of MDs.

Tables 3 and 4 present the total power consumption and the average latency of various offloading schemes with different numbers of MDs, respectively. As shown in Table 3, the All Edge results in more power consumption than other offloading schemes due to the high power of the edge server. Compared to the All Local, both the proposed DRCO and the Greedy cause more power consumption. This is because only local computational resources of low-power MDs are utilized to execute C-PoW tasks by using the All Local. However, from the perspective of the average latency shown in Table 4, both the All Local and the All Edge exhibit a more obvious upward trend than the DRCO or the Greedy with the increasing number of MDs. This is because they do not make a reasonable balance between local and edge resources when using them. By contrast, the Greedy and the DRCO can make better use of resources with effective offloading decisions. Moreover, compared to the Greedy, the DRCO has comparable power consumption while achieving lower latency. This also reflects the excellent performance of the DRCO in obtaining a lower total cost of latency and power consumption. Besides, it can be observed from Table 4 that the average latency of the proposed method is always close to the Optimum with the increasing number of MDs, which demonstrates the outstanding stability of the DRCO in dealing with different scenarios in blockchain-based MCS systems.

TABLE 3

Total power consumption (kWh) of various offloading schemes with different numbers of MDs

| No. of MDs | Total power consumption ($10^{-3}$) | | | | |
|---|---|---|---|---|---|
| | Optimum | All Local | All Edge | Greedy | DRCO |
| 5 | 0.079 | 0.003 | 0.079 | 0.079 | 0.079 |
| 10 | 0.479 | 0.010 | 0.637 | 0.478 | 0.479 |
| 15 | 1.028 | 0.017 | 1.634 | 0.905 | 0.987 |
| 20 | 1.570 | 0.026 | 3.198 | 1.636 | 1.752 |
| 25 | 2.317 | 0.039 | 6.152 | 2.058 | 2.781 |
| 30 | 2.838 | 0.054 | 10.057 | 3.798 | 2.716 |
| 35 | 4.843 | 0.070 | 15.236 | 4.542 | 4.922 |
| 40 | 4.565 | 0.085 | 21.125 | 6.399 | 4.049 |
| 45 | 6.904 | 0.102 | 28.662 | 6.360 | 6.661 |
| 50 | 7.710 | 0.122 | 37.954 | 6.505 | 7.673 |

TABLE 4

Average latency (s) of various offloading schemes with different numbers of MDs

| No. of MDs | Average latency | | | | |
|---|---|---|---|---|---|
| | Optimum | All Local | All Edge | Greedy | DRCO |
| 5 | 0.226 | 1.811 | 0.226 | 0.226 | 0.226 |
| 10 | 0.914 | 3.669 | 0.917 | 0.920 | 0.914 |
| 15 | 1.229 | 4.182 | 1.526 | 1.585 | 1.346 |
| 20 | 1.986 | 4.603 | 2.301 | 2.257 | 2.033 |
| 25 | 3.012 | 5.667 | 3.542 | 3.315 | 3.058 |
| 30 | 3.729 | 6.434 | 4.827 | 4.009 | 3.847 |
| 35 | 4.538 | 7.161 | 6.271 | 4.919 | 4.610 |
| 40 | 5.153 | 7.602 | 7.602 | 5.311 | 5.277 |
| 45 | 5.843 | 8.150 | 9.178 | 6.132 | 5.904 |
| 50 | 6.539 | 8.741 | 10.927 | 6.961 | 6.550 |

Figure 6:
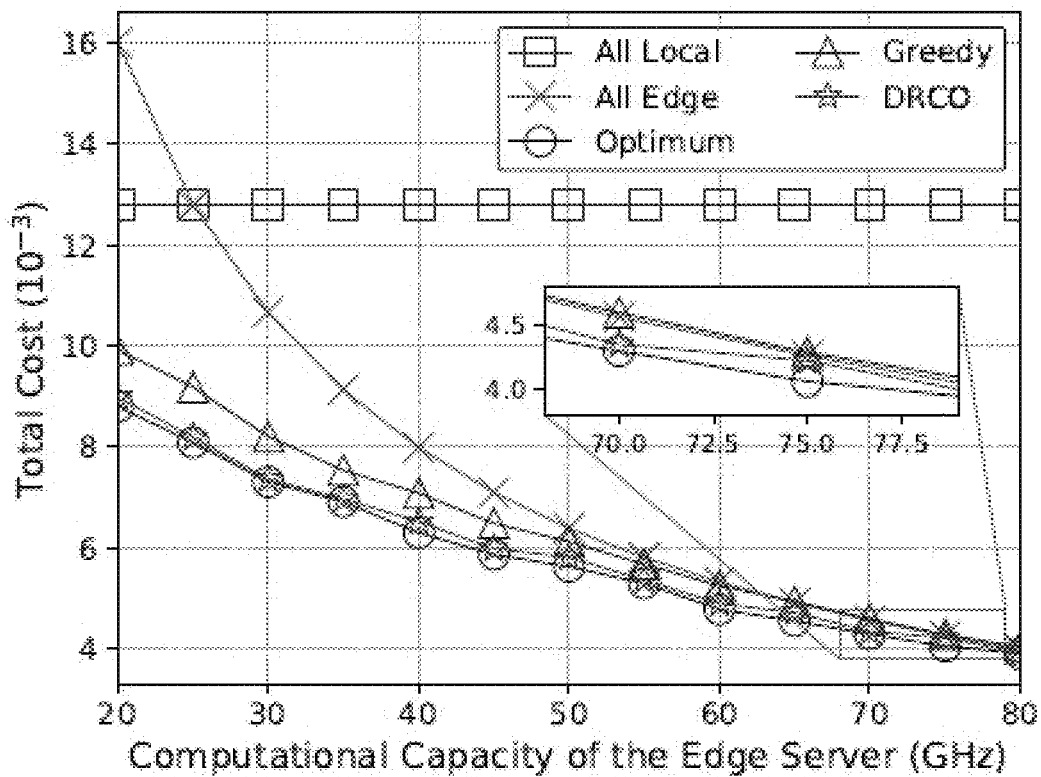
FIG. 6 shows the total cost of different offloading schemes with various computational capacity of the edge server.

FIG. 6 depicts the total cost of various offloading schemes with different computational capacity of the edge server, where the number of MDs is set to 20. On one hand, the growing computational capacity has no effects on the total cost when using the All Local, because the edge resources are not utilized to process C-PoW tasks under this scheme. On the other hand, the total cost generated by other offloading schemes declines with the increase of the computational capacity. This implies that the total cost of executing C-PoW tasks can be effectively reduced by enhancing the computational capacity of the edge server. More specifically, the proposed DRCO always approximates the Optimum under different scenarios. Moreover, when this value is limited (e.g. less than 50 GHZ), the DRCO outperforms other offloading schemes. Besides, as the computational capacity grows (e.g. over 70 GHZ), the total cost of all these offloading schemes (except the All Local) tends to be consistent. This is because the advantage of offloading C-PoW tasks becomes considerable when the computational capacity of the edge server far exceeds an MD.

Figure 7:
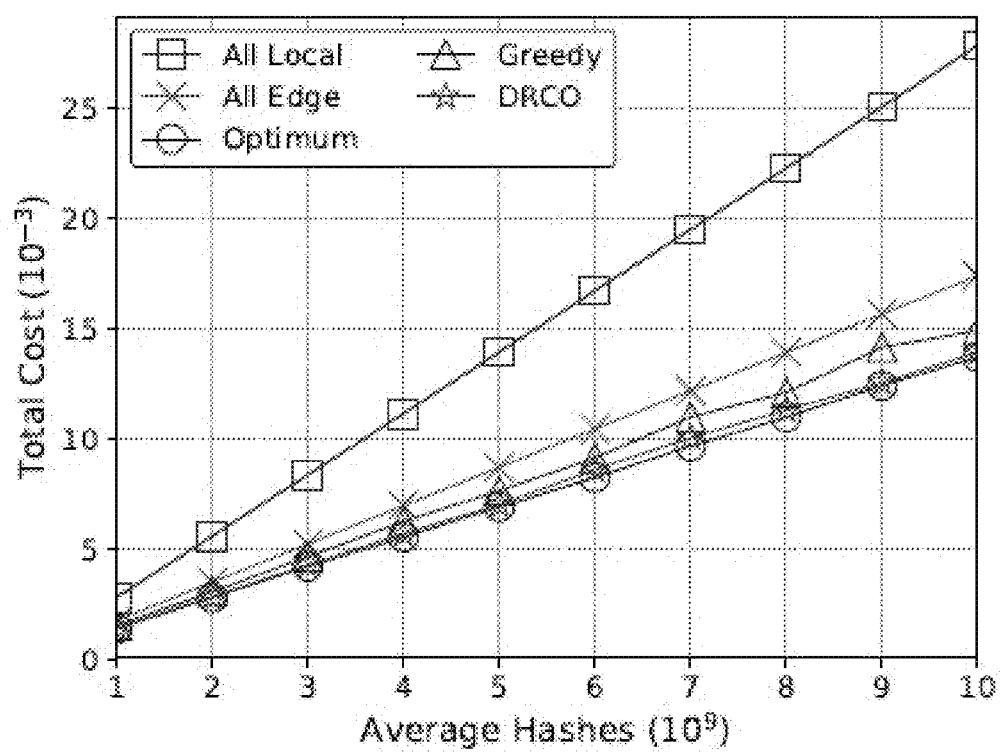
FIG. 7 shows the total cost of various offloading schemes with different degrees of difficulty of C-PoW in the blockchain.

Next, we set the number of MDs as 20 and evaluate the performance of the DRCO with various degrees of difficulty of C-PoW, which is represented by the average hashes during the mining process. As shown in FIG. 7, the total cost of all these offloading schemes increases with the increasing number of average hashes because more complex hashing means higher latency and power consumption. Especially, All Local has the worst performance because only the limited local computational resources are utilized for processing the computation-intensive C-PoW. By contrast, the DRCO can achieve the lowest cost that is near-optimal with various average hashes, especially when the hashing becomes extremely complicated. These results demonstrate that the proposed DRCO works well for offloading different C-PoW tasks in blockchain-based MCS systems.

Finally, we compare the DRCO with advanced RL-based methods (i.e. Q-learning, DQN, and PPO). As illustrated in Table 5, as the number of MDs is small, the Q-learning attains acceptable result that is similar with the DRCO, approximating to the Optimum. Nevertheless, as the number of MDs is large (e.g. over 50), the Q-learning is unable to make offloading decisions anymore (denoted by N/A) because it fails to deal with the problem of high-dimensional space. In contrast, the DRCO effectively deals with this problem in the complex blockchain-based MCS environment with many MDs. As for DQN and PPO, the performance gap compared to the Optimum also becomes larger, because they use a simple replay memory with excessive redundant information. Taking the advantage of DNC, the DRCO trains the DRL agent in an objective-oriented manner by using a network controller. Thus, the DRCO achieves better performance than the DQN and PPO.

TABLE 5

Average latency (s) of various offloading schemes with different numbers of MDs

| No. of MDs | Average latency | | | | |
|---|---|---|---|---|---|
| | Optimum | All Local | All Edge | Greedy | DRCO |
| 10 | 1.509 | 1.517 | 1.513 | 1.509 | 1.509 |
| 20 | 6.302 | 6.867 | 6.709 | 6.523 | 6.494 |
| 30 | 16.957 | 17.550 | 17.477 | 17.391 | 17.108 |
| 40 | 30.907 | 31.568 | 31.426 | 31.346 | 31.077 |
| 50 | 49.264 | 49.551 | 49.434 | 49.320 | 49.296 |
| 60 | 65.707 | N/A | 65.987 | 65.786 | 65.739 |
| 70 | 83.321 | N/A | 84.008 | 83.471 | 83.378 |
| 80 | 103.826 | N/A | 104.762 | 104.023 | 103.892 |

In the present invention, we first develop a new consortium blockchain-based framework for secure transactions in MCS systems. Next, we design a novel C-PoW to relieve the computational complexity of PoW while maintaining the high reliability of the blockchain. Finally, we propose a new DRCO method to handle the computation-intensive C-PoW. The extensive experiments verify the effectiveness of the DRCO. Specifically, the DRCO outperforms common heuristic offloading schemes in terms of a total cost (weighted sum of latency and power consumption) and approximates the optimal result with various scenarios. Moreover, the DRCO works better than the advanced Q-learning, DQN, and PPO based offloading schemes.

REFERENCES

[1] John Schulman, Filip Wolski, Prafulla Dhariwal, Alec Radford, and Oleg Klimov. Proximal policy optimization algorithms. *arXiv preprint arXiv:* 1707.06347, 2017.
[2] Lichuan Ma, Xuefeng Liu, Qingqi Pei, and Yong Xiang. Privacy-preserving reputation management for edge computing enhanced mobile crowdsensing. *IEEE Transactions on Services Computing (TSC)*, 2018.
[3] Dapeng Wu, Shushan Si, Shaoen Wu, and Ruyan Wang. Dynamic trust relationships aware data privacy protection in mobile crowdsensing. *IEEE Internet of Things (IoT) Journal*, 5(4): 2958-2970, 2018.

[4] Jianbing Ni, Kuan Zhang, Qi Xia, Xiaodong Lin, and Xuemin Sherman Shen. Enabling strong privacy preservation and accurate task allocation for mobile crowdsensing. *IEEE Transactions on Mobile Computing (TMC)*, 2019.

[5] Haiqin Wu, Liangmin Wang, Guoliang Xue, Jian Tang, and Dejun Yang. Enabling data trustworthiness and user privacy in mobile crowdsensing. *IEEE/ACM Transactions on Networking (TON)*, 2019.

[6] Thinh Quang Dinh, Quang Duy La, Tony QS Quek, and Hyundong Shin. Learning for computation offloading in mobile edge computing. *IEEE Transactions on Communications (TCOM)*, 66(12): 6353-6367, 2018.

[7] Minghui Min, Liang Xiao, Ye Chen, Peng Cheng, Di Wu, and Weihua Zhuang. Learning-based computation offloading for iot devices with energy harvesting. *IEEE Transactions on Vehicular Technology (TVT)*, 68(2): 1930-1941, 2019.

The above are preferred embodiments of the present invention, and any change made in accordance with the technical solution of the present invention shall fall within the protection scope of the present invention if its function and role do not exceed the scope of the technical solution of the present invention.

What is claimed is:

1. A computation offloading approach in blockchain-enabled Mobile Crowdsensing (MCS) systems, comprising:
   building a consortium blockchain-based framework to guarantee secure transactions in MCS systems;
   designing a credit-based proof-of-work (C-PoW) algorithm to confirm transactions and add new blocks to a chain, thereby relieving a complexity of POW while keeping a reliability of blockchain;
   using a scalable deep reinforcement learning based computation offloading (DRCO) method to handle computational tasks of C-PoW; by integrating Proximal Policy Optimization (PPO) and Differentiable Neural Computer (DNC), the DRCO executes differentiable read-write operations on structured external memories by following an objective-oriented process; the DRCO uses a clipped surrogate objective to control an update of offloading policy, in order to improve a decision-making efficiency; the DRCO uses DNNs to address a problem of high-dimensional state space;
   wherein in the C-PoW, a user credit (VC) is used to evaluate contributions of participants to a MCS sensing task; the VC is positively correlated to an amount of valid uploaded data; the VC of an MCS participant for the MCS sensing task is defined as $$vc_n = 1 + \frac{V_n}{V_{total}}, \quad (2)$$

where $V_n$ and $V_{total}$ are an amount of valid data uploaded from $MD_n$ and a total amount of data required for the MCS sensing task, respectively; $VC_n$ only works for the MCS sensing task and cannot be accumulated for subsequent MCS sensing tasks; when the MCS sensing task is completed or changed, a corresponding $V_n$ is recalculated;
through introducing VC into a mining process, a PoW Eq. (3) is as follows:

$$\text{Find nonce} \quad (3)$$
$$\text{s.t. } SHA256(Str'_n) < vc_n \cdot \text{target}.$$

following the C-PoW, when a participant contributes more to the MCS sensing task, the participant will obtain a higher VC and a mining difficulty will be relieved; otherwise, the participant cannot receive treatment as the participant processes a PoW task; wherein higher credit leads to higher priority of broadcasting and verifying when many participants append blocks.

2. The computation offloading approach in blockchain-enabled MCS systems according to claim 1, wherein in the consortium blockchain-based framework, a transaction is first added by a Mobile Device (MD) to a new block; after the new block is done, the new block is broadcasted to other MDs on a blockchain network; next, the new block is received and verified by each of the other MDs for concerns of security and data integrity; once passing the verification, the new block will be finally added to a blockchain maintained by the MDs; otherwise, the new block will be dropped; when an MD successfully appends the new block, the new block will obtain a reward;
there is only one blockchain that is maintained, but the MDs are configured to generate different new blocks simultaneously; the MDs must choose a same new block to be appended; the MD must complete some extra work before the MD broadcasts the new block, including the following steps:
Step 1: contents of $Block_n$ are transferred to a string, denoted by $Str_n$=SHA256 ($Block_{n-1}$−1)+basic information of $Block_n$+transactions in $Block_n$; each block owns a one-to-one correspondence with SHA256( ) value, and a cryptographic hash function, in order to make an index; $Block_n$ contains a SHA256( ) value of the contents in $Block_{n-1}$; therefore, the SHA256( ) value is used to connect blocks in order;
Step 2: a random value nonce is appended to $Str_n$ to form a new string, denoted by $Str'_n$=$Str_n$+nonce; next, $Str'_n$ is added to SHA256( ) to get a 256-bit binary value; wherein the Eq. (3) is a modified version of an Eq. (1), as described in the Eq. (1), when a binary value is smaller than a target, which indicates the mining difficulty, the extra work is completed successfully; difficulty of mining, denoted by D, increases as a number of MDs grows, and thus avoid conflicts when the MDs tend to append blocks simultaneously;

$$\text{Find nonce} \quad (1)$$
$$\text{s.t. } SHA256(Str'_n) < \text{target},$$

where target=$2^{(256-D)}$−1, and D=$D_{base}$+lg(m); $D_{base}$ represents a predefined basic difficulty of mining (0≤D base≤255), and m is the number of MDs.

3. The computation offloading approach in blockchain-enabled MCS systems according to claim 1, wherein due to limited computational capacity of MDs, C-PoW tasks are offloaded to one or more edge servers for execution;
building a offloading model to reduce a cost of processing C-PoW tasks in blockchain-based MCS systems; a single-edge scenario, which consists of one of the edge servers of the one or more edge servers with one or more base stations (BSs), and a set of MDs, donated by MD={MD$_1$, MD$_2$, ..., MD$_m$}, where m represents a number of MDs in the set of MDs; bandwidth is equally shared by the set of MDs; when an MD of the set of MDs finishes an MCS transaction, the transaction will be stored to a block and the block is appended to the blockchain; for this purpose, a MD of the set of MDs processes a C-PoW task, and the block will be broadcast and verified by other MDs of the set of MDs;

a C-PoW task to be processed by MD$_n$ (1≤n≤m) is defined as a 2-tuple, denoted by T$_n$=<D$_n$, U$_n$>; D$_n$ indicates a size of input data (contents of a block), and the input data is also input to SHA256( ); U$_n$ indicates computational resources needed (CPU cycles) to process T$_n$, positive to hashes for achieving a qualified value of SHA256( ), where calculating speed is one hash per CPU cycle; moreover, computational capacity of an edge server of the one or more edge servers and an MD of the set of MDs are denoted by E and e$_n^{local}$, respectively;

the edge server of the one or more edge servers and the set of MDs offers computing services for C-PoW tasks that can be processed locally or offloaded for execution; therefore, two modes are defined as follows;

Local Mode: when T$_n$ is processed locally, a latency generated by MD$_n$ is defined as:

$$L_n^{local} = \frac{U_n}{r_n^{local}}, \quad (4)$$

power consumption of processing T$_n$ is defined as:

$$P_n^{local} = \psi \cdot (e_n^{local})^2 \cdot U_n, \quad (5)$$

where $\psi$ is a power parameter for each CPU cycle; L$_n^{local}$ and P$_n^{local}$ are normalized into same-scale values, donated by [a, b], where a=avg(min(L$_n^{local}$), min(P$_n^{local}$)) and b=avg(max(L$_n^{local}$), max(P$_n^{local}$); a normalization equation is given by $$x' = a + \mathcal{N} \cdot (x - \min(\mathcal{X})), \quad (6)$$

where x is input data (e.g. L$_n^{local}$ or P$_n^{local}$) and x' is an output value after normalization (e.g. (L$_n^{local}$)' or (P$_n^{local}$)');

$$\mathcal{N} = \frac{b-a}{\max(x) - \min(x)}$$

is a normalization coefficient. max(X) and min(X) are maximum and minimum values of sample data X (e.g. $\mathcal{X}$=(L$_1^{local}$, L$_2^{local}$, ..., L$_n^{local}$);

after normalization, defining a cost of completing the task T$_n$ in Local Mode as $$C_n^{local} = \theta \cdot (L_n^{local})' + (1 - \theta) \cdot (P_n^{local})', \quad (7)$$

where $\theta$ (0≤$\theta$≤1) is used to weight different items;

Edge Mode: when T$_n$ is offloaded for processing, a procedure is given as follows;

Step 1: MD$_n$ uploads the input data D$_n$ to an edge server of the one or more edge servers via a wireless channel; defining a corresponding transmission latency that happens in MD$_n$ as $$L_n^{edge,t} = \frac{D_n}{r_n}, \quad (8)$$

where r$_n$ is an uplink rate of MD$_n$;

a corresponding power consumption of MD$_n$ is defined as $$P_n^{edge,t} = P_n^{trans} \cdot L_n^{edge,t}, \quad (9)$$

where P$_n^{trans}$ is a transmission power of MD$_n$;

Step 2: the edge server of the one or more edge servers allocates computational resources and processes T$_n$; defining a latency of processing T$_n$ as $$L_n^{edge,p} = \frac{U_n}{e_n^{edge}}, \quad (10)$$

where e$_n^{edge}$ represents the allocated computational resources to process T$_n$, and $\Sigma_1^m$ e$_n^{edge}$≤E;

a corresponding power consumption is defined as $$P_n^{edge,p} = (P^{server} + p_n^{idle}) \cdot L_n^{edge,p}, \quad (11)$$

where P$^{server}$ and P$_n^{idle}$ are power of the edge server of the one or more edge servers and idle power of MD$_n$, respectively;

Step 3: MD$_n$ downloads result of task T$_n$; the result of task T$_n$ is nonce that meet target of C-PoW; with Eq. (6), the cost of completing the task T$_n$ in Edge Mode is:

$$C_n^{edge} = \theta \cdot (L_n^{edge})' + (1 - \theta) \cdot (P_n^{edge})', \quad (12)$$

where $\theta$ is defined in Eq. (7); moreover, a latency and a power consumption of completing the task T$_n$ in Edge Mode is calculated by Eq. (13);

$$L_n^{edge} = L_n^{edge,t} + L_n^{edge,p}, \quad P_n^{edge} = P_n^{edge,t} + P_n^{edge,p}. \quad (13)$$

by combining a cost of two modes, a total cost with different offloading decisions is calculated as:

$$C^{total} = \sum_1^m \left((1 - a_n) \cdot C_n^{local} + a_n \cdot C_n^{edge}\right), \quad (14)$$

where a$_n$∈ {0, 1} indicates an offloading decision of MD$_n$; moreover, C$_n^{local}$ and C$_n^{edge}$ are the cost of completing the task T$_n$ in Local Mode and Edge Mode, respectively.

4. The computation offloading approach in blockchain-enabled MCS systems according to claim 3, wherein the DRCO is used to obtain an optimal offloading in blockchain-based MCS systems; a offloading scenario in blockchain-based MCS systems is regarded as an environment, and a Deep Reinforcement Learning (DRL) agent selects actions by communicating with the environment; a state space, action space and reward function for DRCO are defined as follows;

State space: the state space contains four parts, including a set of C-PoW tasks (denoted by T), set of a computational capacity of MDs (denoted by $\varepsilon^{local}$), available computational capacity of the edge server of the one or more edge servers (denoted by $E^{avail}$), and network status (denoted by O), where $T=\{T_1, T_2, \ldots, T_m\}$, $\varepsilon^{local}=\{e_1^{local}, e_2^{local}, \ldots, e_m^{local}\}$, $E^{avail}=E-\Sigma_1^m e_n^{edge}$, and O contains the bandwidth and the uplink rate of each MD; O is defined as a 4-tuple, denoted by $S=<T, \varepsilon^{local}, E^{avail}, O>$, considering a task overhead, system resource, and network status;

Action space: the DRL agent takes offloading actions for C-PoW tasks; the DRL agent is defined as $A=\{a_n | a_n \in \{0, 1\}, 1 \leq n \leq m\}$, which indicates a binary offloading decision for each MD; when $a_n=1$, the task $T_n$ is processed by $MD_n$ locally; otherwise, $T_n$ is offloaded for execution;

Reward function: the reward function guides the DRL agent to learn an optimized policy, aiming to minimize a total cost of computation offloading; the DRL agent is negatively-correlated to a total cost (denoted by $C^{total}$) after making offloading decisions, which is defined as $$\mathcal{R} = 1 - \frac{C^{total}}{\sum_1^m C_n^{local} + \sum_1^m C_n^{edge}}, \quad (15)$$

where $\Sigma_1^m C_n^{local}$ and $\Sigma_1^m C_n^{edge}$ indicate a cost when all C-PoW tasks are processed by MDs or the edge server of the one or more edge servers, respectively, which are used to normalize $C^{total}$;

the DRL agent first selects one or more offloading actions based on a current state; accordingly, a reward is feedback from the environment and the current state goes to a next state; the DRL agent is formulated as a Markov decision process (MDP); a model-free RL is used in the DRCO method; PPO is used to train DNNs for optimizing offloading policies; PPO is an actor-critic based RL, combining the value-based RL (a critic) and policy-based RL (an actor); the DRCO method includes following steps: first, initializing an actor's network $V^{\pi\theta}$ and a critic's network $Q^{\pi\theta}$; an actor's and a critic's learning rate $\gamma_a$ and $\gamma_c$, reward decay rate $\lambda$, TD error discount factor $\beta$, mini-batch size $\alpha$, and memory module M in the DNC cell are initialized; after initializing the current state, starting the training epochs for the DRCO;

in each training epoch, the environment is first refreshed; next, the offloading actions for C-PoW tasks are selected on the current state; next, a reward is calculated after executing the offloading actions, and the environment steps to the next state; during a training process, sample trajectories are stored in the memory M; next, policy parameters are updated by mini-batch; training of DRCO is based on the policy gradient algorithm with a gradient estimator as:

$$\nabla_{\theta_t} J(\theta_t) = E_{\pi_{\theta_t}} \left[ \nabla_{\theta_t} \log \pi_{\theta_t}(\mathcal{S}_t, \mathcal{A}_t) Q^{\pi_{\theta_t}}(\mathcal{S}_t, \mathcal{A}_t) \right], \quad (16)$$

where $$E_{\pi_{\theta_t}}$$

is an empirical average, $\pi_{\theta_t}$ is an offloading policy, and $$Q^{\pi_{\theta_t}}$$

is an action-value function;
in each mini-batch, discounted rewards of recent actions are first calculated; next, reducing, a gradient variance by using an advantage function, denoted by $$AF^{\pi_{\theta_t}}$$

where $$V^{\pi\theta}$$

is a state-value function; next, optimizing $$AF^{\pi_{\theta_t}}$$

by minimizing a loss of the critic's network, which is, denote by $$L^{critic}(\theta_t) = E_M (\delta^{\pi_{\theta_t}})^2,$$

where $$\delta^{\pi_{\theta_t}} = \mathcal{R}_t + \beta V^{\pi_{\theta_{t+1}}}(\mathcal{S}_{t+1}) - V^{\pi_{\theta_t}}(\mathcal{S}_t);$$

furthermore, a gradient estimator is obtained by differentiating an objective function of policy gradient as:

$$J(\theta_t) = E_{\pi_{\theta_t}} \left[ \log \pi_{\theta_t}(\mathcal{S}_t, \mathcal{A}_t) AF^{\pi_{\theta_t}}(\mathcal{S}_t, \mathcal{A}_t) \right], \quad (17)$$

integrating PPO and DNC to enhance scalability and efficiency of learning an optimal policy; a DNC cell adopts a network controller to control reading and writing in memory, enabling the DRL agent to be optimized via an objective-oriented way; a network controller constructed by DNN first receives a system state from the environment; wherein a memory module stores the system state and reward from the environment, and the action from the actor's network, respectively; next, an interface vector $\xi$ is generated to parameterize interactions between the network controller and memory module, which ensures that the memory module is updated in a correct domain for approaching optimal offloading policies; finally, through concatenating an output vector v of the network controller and a read vector Read of the memory module, a final output of the DNC cell is calculated in a linear layer as follows:

$$V^{\pi_{\theta_i}}(s) = v + W_R \cdot \text{Read}, \quad (18)$$

where $W_R$ is a weight matrix of a linear layer;
in the DNC cell, a differentiable attention mechanism determines locations that contain read or write operations in the memory module, where weightings are trained to make decisions for executing these operations; the read vector is defined as follows:

$$\text{Read} = \omega^r \cdot M^\top, \quad (19)$$

where a read weight $w^r$ is used to calculate weighted averages over contents of locations, and M indicates a current status of a memory matrix;
the write operation is a combination of a write weight $w^w$, an erase vector e, and a write vector Write; thus, the memory matrix M is updated by a following write operation:

$$M = M' \cdot (1 - w^w \cdot e^\top) + w^w \cdot \text{Write}^\top, \quad (20)$$

where vectors e and Write are components of interface vector $\xi$, and M' represents the current status of the memory matrix at a last timestep;
with memory operations provided by the DNC cell, an efficiency $$V^{\pi_{\theta_t}}(s)$$

estimation is obtained for the critic's network in a PPO-based DRL agent;
the gradient estimator is then modified as:

$$\nabla_{\theta_t} J(\theta_t) = E_{\pi_{\theta_t}} \left[ \nabla_{\theta_t} \log \pi_{\theta_t}(s, a) AF^{\pi_{\theta_t}}(S_t, \mathcal{A}_t) \right], \quad (21)$$

the modified gradient estimator is calculated by differentiating a following second objective function of policy gradient:

$$L^{PG}(\theta_t) = J(\theta_t) = E_{\pi_{\theta_t}} \left[ \log \pi_{\theta_t}(S_t, \mathcal{A}_t) AF^{\pi_{\theta_t}}(S_t, \mathcal{A}_t) \right], \quad (22)$$

utilizing Kullback-Leibler (KL) to restrict differences between an old and a new policy to a certain value $\xi$ (a trust region) in Eq. (23);

$$\underset{\theta_t}{\text{maximize}} \ E_{\pi_{\theta_t}} \left[ \frac{\pi_\theta(S_t, \mathcal{A}_t)}{\pi_{\theta_{old}}(S_t, \mathcal{A}_t)} AF^{\pi_{\theta_t}}(S_t, \mathcal{A}_t) \right], \quad (23)$$

$$\text{s.t. } E_{\pi_{\theta_t}} \left[ KL[\pi_{\theta_{old}}(S_t), \pi_{\theta_t}(S_t)] \right] \leq \xi$$

where $\theta_{old}$ represents the old policy;
following an above formula, the old policy is first used for data sampling a state, action, and rewards) in the environment; next, random sampling is performed on data to obtain a mini-batch for optimizing the old policy; a second derivative is executed for estimating constraint; optimizing an efficiency of data sampling through using a first derivative with a clipped surrogate objective as:

$$L^{CLIP}(\theta_t) = E_{\pi_{\theta_t}} \left[ \min(r(\theta) AF^{\pi_{\theta_t}}(S_t, \mathcal{A}_t), \quad (24) \right.$$

$$\text{clip}(r(\theta_t), 1 - \epsilon, 1 + \epsilon) AF^{\pi_{\theta_t}}(S_t, \mathcal{A}_t)) \big],$$

$$\text{where } r(\theta_t) = \pi_\theta(S_t, \mathcal{A}_t) / \pi_{\theta_{old}}(S_t, \mathcal{A}_t).$$

through using a clip function, cases that $r(\theta_t)$ leaves an interval $[1-\epsilon, 1+\epsilon]$ are eliminated, which also means changes of $r(\theta)$ are clipped to the interval $[1-\epsilon, 1+\epsilon]$ when $r(\theta_t)$ optimizes an objective function;
referring to a critic's evaluation, the actor optimizes the clipped surrogate objective $L^{CLIP}(\theta_t)$ with low variance by using an advantage function $$AF^{\pi_{\theta_t}}(S_t, \mathcal{A}_t);$$

with the help of a clipped surrogate objective $L^{CLIP}(\theta_t)$, an efficiency of data sampling and a decision making of step size is improved; finally, the environment updates the environment's current state to a next one and goes to a subsequent episode.

* * * * *